(12) United States Patent
Yang et al.

(10) Patent No.: US 12,513,758 B2
(45) Date of Patent: Dec. 30, 2025

(54) BROADCAST-BASED UNICAST SESSION METHOD AND APPARATUS

(71) Applicant: Shenzhen Yinwang Intelligent Technologies Co., Ltd., Shenzhen (CN)

(72) Inventors: Miao Yang, Beijing (CN); Mingchao Li, Beijing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 358 days.

(21) Appl. No.: 18/188,224

(22) Filed: Mar. 22, 2023

(65) Prior Publication Data

US 2023/0224983 A1 Jul. 13, 2023

Related U.S. Application Data

(63) Continuation of application No. PCT/CN2021/117856, filed on Sep. 11, 2021.

(30) Foreign Application Priority Data

Sep. 22, 2020 (CN) .......................... 202011002526.5

(51) Int. Cl.
*H04W 76/10* (2018.01)
*H04L 1/16* (2023.01)
*H04W 76/40* (2018.01)

(52) U.S. Cl.
CPC ............... *H04W 76/10* (2018.02); *H04L 1/16* (2013.01); *H04W 76/40* (2018.02)

(58) Field of Classification Search
CPC ....... H04W 76/10; H04W 76/40; H04W 4/44; H04W 4/06; H04W 76/11; H04W 4/40; H04L 1/16; H04L 61/103; H04L 61/5038; H04L 61/5092; H04L 2101/622; H04L 61/5046; G07B 15/063

(Continued)

(56) References Cited

U.S. PATENT DOCUMENTS

2013/0297757 A1* 11/2013 Han .................... H04L 41/0806
709/222
2014/0016461 A1* 1/2014 Ishikawa ................. H04L 47/35
370/230

(Continued)

OTHER PUBLICATIONS

"Cooperative intelligent transportation system: vehicular communication, Application layer specification and data exchange standard, Phase II," total 276 pages (Nov. 26, 2020). With English translation.

*Primary Examiner* — Kwang B Yao
*Assistant Examiner* — Syed M Bokhari
(74) *Attorney, Agent, or Firm* — Leydig, Voit & Mayer, Ltd.

(57) ABSTRACT

Embodiments of the present application provide a broadcast mechanism-based unicast session system, method, and apparatus, a computer-readable storage medium, and a vehicle, to establish a unicast session carried through broadcast between an initiator device and a responder device. An extension identifier of the initiator device or the responder device is added to a unicast request message, a unicast response message, or a unicast acknowledgment message sent in a broadcast manner, to avoid a session error caused by a MAC identifier conflict of the initiator device or the responder device, thereby improving reliability of the unicast session.

15 Claims, 9 Drawing Sheets

(58) Field of Classification Search
USPC .......................................................... 370/312
See application file for complete search history.

(56) References Cited

U.S. PATENT DOCUMENTS

2018/0205699 A1* 7/2018 Weinfield .............. H04W 4/023
2019/0340844 A1* 11/2019 Tonshal ............... G07C 5/0808

* cited by examiner

BROADCAST-BASED UNICAST SESSION METHOD AND APPARATUS

CROSS-REFERENCE TO RELATED APPLICATIONS

This application is a continuation of International Application No. PCT/CN2021/117856, filed on Sep. 11, 2021, which claims priority to Chinese Patent Application No. 202011002526.5, filed on Sep. 22, 2020. The disclosures of the aforementioned applications are hereby incorporated by reference in their entireties.

TECHNICAL FIELD

The present application relates to the field of vehicle-to-everything technologies, and in particular, to a broadcast-based unicast session method and apparatus.

BACKGROUND

With continuous development of the society, automobiles are increasingly popular. While driving brings convenience to people, it also has negative impact on the social environment. For example, a rapid increase in a quantity of vehicles causes a series of problems such as urban traffic congestion, frequent traffic accidents, and poor environmental quality. Therefore, a V2X (Vehicle-to-Everything) communication technology emerges. A vehicle may obtain road traffic information and safety warning information in a timely manner by using vehicle-to-vehicle (V2V), vehicle-to-infrastructure (V2I), vehicle-to-pedestrian (V2P), or vehicle-to-network (V2N). In this way, traffic safety risks are reduced to an extent, and traffic efficiency is improved.

Currently, a communication manner based on a 4G (fourth generation mobile communication technology) V2X technology is mainly message broadcast. However, with continuous development of application scenarios of intelligent connected vehicles, a vehicle-to-everything application has gradually evolved from an application in a broadcast service mode to an application supporting unicast or multicast, for example, vehicle near field payment, vehicle-assisted decision-making, or vehicle platoon driving. Information exchanged between these applications needs to be performed between one-to-one or one-to-many terminals, and a transmitting end needs to send different data to different receiving ends. Therefore, a unicast communication scenario needs to be considered in a V2X system.

FIG. 1 is used as an example below to describe a 4G V2X broadcast-based technical system. A road side unit (RSU) RSU 1 repeatedly sends a message Msg 0 through broadcast. Within a communication range, three on board units (OBU) OBU 1, OBU 2, and OBU 3 receive the same message Msg 0. Addressing does not need to be performed between the road side unit and the on board units. In addition, to anonymize a transmitting end, a source MAC (Media Access Control) address in the message Msg 0 is randomly generated, and a destination MAC identifier is generated by mapping an application identifier. If the OBU 1, the OBU 2, and the OBU 3 respectively send response messages Msg 1, Msg 2, and Msg 3, source MAC identifiers MAC 1, MAC 2, and MAC 3 in the three response messages are also randomly generated. After the three response messages are received by the RSU 1, a MAC identifier conflict occurs. On one hand, two different OBUs may respond to the same Msg 0, and source MAC identifiers in response messages are the same (for example, MAC 1=MAC 2). In this case, the RSU 1 cannot distinguish which OBUs send the Msg 1 and the Msg 2 to the RSU 1, and cannot make a right response. On another hand, the Msg 2 may be a message for the OBU 2 to respond to another RSU, and the MAC 2 is the same as the MAC 1 in the Msg 1 that is used by the OBU 1 to respond to the RSU. Therefore, the RSU 1 cannot determine whether the Msg 2 is used to respond to the RSU 1. Further, when a MAC identifier conflict exists, if a sent data packet is segmented at an RLC (Radio Link Control) layer, and reassembled at the RLC layer during receiving, an error occurs, causing a message parsing failure.

In the future, a 5G (fifth generation mobile communication technology)-based V2X technology will support a unicast service, but it is still early to implement standardization and industrialization of the V2X technology. However, a 4G V2X broadcast-based physical layer channel design has been determined. A manner of allocating a dedicated time-frequency resource or a dedicated physical channel for a unicast service by modifying or redesigning a physical layer is very complex and long, and is difficult to implement currently.

Therefore, how to implement a simple, effective, and reliable unicast service in a broadcast-based technical system is a technical problem that needs to be urgently resolved.

SUMMARY

Embodiments of the present application provide a broadcast-based unicast session method, apparatus, and system, a computer-readable storage medium, a computer program product, and a vehicle, to resolve a technical problem in the conventional technology that a broadcast-based technical system cannot support a unicast service.

According to a first aspect, a broadcast-based unicast session system is provided, including an initiator device and at least one responder device, where the at least one responder device includes a first responder device, and the first responder device is any one or a specific responder device in a network environment or system of the present application. The initiator device is configured to send a first unicast request message through periodic broadcast, where the first unicast request message includes a unicast service type requested by the initiator device of the unicast session, unicast service data requested by the initiator device, and a first media access control MAC identifier and a first extension identifier of the initiator device. The first MAC identifier is a dynamically updated identifier of the initiator device at a media access control layer, the first extension identifier is used to distinguish the initiator device from another initiator device, and the first extension identifier is different from the first MAC identifier. The first responder device is configured to: receive the first unicast request message, and send, in response to the received first unicast request message, a first unicast response message through broadcast, where the first unicast response message includes a unicast service type responded by the first responder device of the unicast session, unicast service data responded by the first responder device, the first MAC identifier, the first extension identifier, and a second media access control MAC identifier and a second extension identifier of the first responder device. The second MAC identifier is a dynamically updated identifier of the first responder device at the media access control layer, the second extension identifier is used to distinguish the first responder device from another responder device, and the second extension identifier is different from the second MAC identifier. The initiator device is further configured to: receive the first unicast response message, and send, in response to the received first unicast response message, a first unicast acknowledgment message through broadcast, where the first unicast acknowledgment message includes acknowledgment information of the unicast service data responded by the first responder device, the first MAC identifier, the first extension identifier, the second MAC identifier, and the second extension identifier. The first responder device is further configured to: receive the first unicast acknowledgment message, and perform service processing related to the unicast session based on the first unicast acknowledgment message. The service processing related to the unicast session is service processing related to the unicast service type and the unicast service data that are in the first unicast response message. For example, in a vehicle near field payment scenario, the initiator device is a roadside toll collection device, and the responder device is a vehicle. After receiving a unicast acknowledgment message that is related to a payment service and that is from the roadside toll collection device, the vehicle performs service processing related to fee payment. For another example, in a vehicle platoon driving scenario, the initiator device is a first vehicle, and the responder device is a second vehicle. After receiving a unicast acknowledgment message that is from the first vehicle and that is related to platoon summoning, the second vehicle performs service processing of forming a vehicle platoon with the first vehicle.

The initiator device determines, by identifying that an MAC identifier of the initiator device in the first unicast response message is the first MAC identifier in the first unicast request message, and the extension identifier of the initiator device in the first unicast response message is the first extension identifier in the first unicast request message, that the first unicast response message is a response to the initiator device. Similarly, after receiving the first unicast acknowledgment message, the first responder device may determine, by identifying the first MAC identifier, the first extension identifier, the second MAC identifier, and the second extension identifier in the first unicast acknowledgment message, whether the received unicast acknowledgment message corresponds to the first unicast response message previously sent by the first responder device. Because a MAC identifier in a session message exchanged between an initiator and a responder through broadcast is dynamically updated, a MAC identifier conflict may occur. By adding an extension identifier used to identify a responder device or an initiator device to a unicast session message transmitted through broadcast, a session error caused by the MAC identifier conflict can be effectively avoided, and a unicast service can be implemented in a broadcast-based technical system.

The initiator device may be a roadside device, or may be an on-board terminal. When the initiator device is a roadside device, the first MAC identifier may be randomly selected within a limited value range, or may be allocated by a roadside operator. When the initiator device is an on-board terminal, the first MAC identifier may be randomly selected within a limited value range. Further, the first MAC identifier may change periodically.

The responder device may be a roadside device, or may be an on-board terminal. When the responder device is a roadside device, the first MAC identifier may be randomly selected within a limited value range, or may be allocated by a roadside operator. When the responder device is an on-board terminal, the first MAC identifier may be randomly selected within a limited value range. Further, the first MAC identifier may change periodically.

Optionally, the first MAC identifier is a random number generated by the initiator device.

Optionally, the second MAC identifier is a random number generated by the responder device.

Optionally, the first extension identifier or the second extension identifier is formed by at least one of a device hardware identifier, a device network access identifier, an electronic identity, an IMEI (International Mobile Equipment Identity), a VIN (Vehicle Identification Number), or spatial location identifier information, or is generated through mapping by using a function in which at least one of the foregoing identifiers is a parameter.

Optionally, the first extension identifier or the second extension identifier is generated as a random number.

Optionally, the first extension identifier or the second extension identifier is generated through manual setting.

Optionally, the first extension identifier or the second extension identifier is set at a DSMP protocol layer of a 4G V2X message.

Optionally, the first extension identifier or the second extension identifier is set in a message body of a message layer of a 4G V2X message.

According to the first aspect, in a first possible implementation of the broadcast-based unicast session system, the initiator device receives a plurality of unicast response messages sent by a plurality of responder devices through broadcast, where the plurality of unicast response messages include the first unicast response message, and the plurality of responder devices include the first responder device; and selects, from the plurality of unicast response messages, at least one unicast response message as a responded unicast response message, where a MAC identifier of the initiator device in each of the at least one unicast response message is the first MAC identifier, an extension identifier of the initiator device in each unicast response message is the first extension identifier, and the at least one unicast response message includes the first unicast response message. Because the first unicast request message is sent through broadcast, the first unicast request message may be received and responded by a plurality of responder devices. The initiator device may select, based on MAC identifiers and extension identifiers of the responder devices carried in a plurality of unicast response messages fed back by the plurality of responder devices, at least one responder device to establish a unicast session.

According to the first aspect or the first possible implementation of the first aspect, in a second possible implementation of the broadcast-based unicast session system, the initiator device sequentially sends, in response to the selected at least one unicast response message, a plurality of unicast acknowledgment messages through broadcast, where the plurality of unicast acknowledgment messages include the first unicast acknowledgment message, and each of the plurality of unicast acknowledgment messages includes: acknowledgment information of unicast service data corresponding to the unicast acknowledgment message, the first MAC identifier, the first extension identifier, and a MAC identifier and an extension identifier of a responder device corresponding to the unicast acknowledgment message. When the initiator device is willing to separately establish a unicast session with a plurality of responder devices, the initiator device may separately perform a unicast session with each of the selected plurality of responder devices by sequentially sending a unicast acknowledgment message through broadcast.

According to the first aspect or any one of the foregoing implementations of the first aspect, in a third possible implementation of the broadcast-based unicast session system, the first unicast acknowledgment message or the first unicast response message includes a message layer and a radio link control layer, content information of the first unicast acknowledgment message or the first unicast response message at the radio link control layer is carried by a data packet, and the message layer of the first unicast acknowledgment message or the first unicast response message includes information used to indicate an attribute of a unicast message. The message layer indicates a unicast service to the RLC layer, so that a unicast service data packet is not segmented at the RLC layer, and it is ensured that the data packet can be parsed even if a MAC identifier conflict occurs, thereby further improving reliability of performing the unicast session through broadcast.

According to the first aspect or any one of the foregoing implementations of the first aspect, in a fourth possible implementation of the broadcast-based unicast session system, sending the first unicast response message through broadcast is repeatedly sending the first unicast response message through broadcast. Repeatedly sending the first unicast response message through broadcast can further improve robustness and reliability of the broadcast-based unicast session system.

According to the first aspect or any one of the foregoing implementations of the first aspect, in a fifth possible implementation of the broadcast-based unicast session system, the first unicast request message further includes first sending indication information, used to indicate at least one of a quantity of times of repeated sending or a repeated sending interval of the first unicast response message. The initiator device may indicate, to the responder by carrying the indication information in the unicast request message, a manner of sending the unicast response message returned for the unicast request message.

According to the first aspect or any one of the foregoing implementations of the first aspect, in a sixth possible implementation of the broadcast-based unicast session system, at least one of an actual quantity of times of repeated sending or an actual repeated sending interval of the first unicast response message is determined based on the first sending indication information. In addition, even if the initiator device indicates, in the unicast request message, the manner of sending the unicast response message to the responder device, the responder may still not follow the indication information, but for example, determine the manner based on service load or a service priority, a channel status, reliability of a unicast service, or a delay requirement of the responder device.

According to the first aspect or any one of the foregoing implementations of the first aspect, in a seventh possible implementation of the broadcast-based unicast session system, sending the first unicast acknowledgment message through broadcast is repeatedly sending the first unicast acknowledgment message through broadcast. Repeatedly sending the first unicast acknowledgment message through broadcast can further improve robustness and reliability of the broadcast-based unicast session system.

According to the first aspect or any one of the foregoing implementations of the first aspect, in an eighth possible implementation of the broadcast-based unicast session system, the first unicast response message further includes second sending indication information, used to indicate at least one of a quantity of times of repeated sending, a repeated sending interval, or remaining waiting time of the first unicast acknowledgment message. The responder device may indicate, to the initiator by carrying the indication information in the unicast response message, a manner of sending the unicast acknowledgment message returned for the unicast response message.

According to the first aspect or any one of the foregoing implementations of the first aspect, in a ninth possible implementation of the broadcast-based unicast session system, at least one of an actual quantity of times of repeated sending or an actual repeated sending interval of the first unicast acknowledgment message is determined based on the second sending indication information. In addition, even if the responder device indicates, in the unicast response message, the manner of sending the unicast acknowledgment message to the initiator device, the initiator may still not follow the indication information, but for example, determine the manner based on service load or a service priority, a channel status, reliability of a unicast service, or a delay requirement of the initiator device.

According to the first aspect or any one of the foregoing implementations of the first aspect, in a tenth possible implementation of the broadcast-based unicast session system, the first unicast request message further includes the second MAC identifier and the second extension identifier. That the first responder device sends a first unicast response message through broadcast includes: When the second MAC identifier in the first unicast request message is the same as a current MAC identifier of the first responder device, and the second extension identifier in the first unicast request message is the same as an extension identifier of the first responder device, the first responder device sends the first unicast response message through broadcast. In other words, the initiator device may invite a specific device to perform a unicast session through broadcast, provided that a MAC identifier and an extension identifier of the invited responder device are set in the unicast request message. For example, in this implementation, the first unicast request message carries the second MAC identifier and the second extension identifier, to indicate to all receiving devices of the first unicast request message, that a device that the initiator device intends to establish a unicast session with is the first responder device to which the second MAC identifier and the second extension identifier belong. According to this implementation, after receiving the first unicast request message, another device may determine, by identifying the MAC identifier and the extension identifier of the responder device in the first unicast request message, that the responder device requested by the initiator device is not the another device, so that no response is made, thereby avoiding a waste of communication resources. On another hand, after receiving the first unicast request message, the first responder device may determine, by identifying the MAC identifier and the extension identifier of the responder device in the first unicast request message, that the responder device requested by the initiator device is the first responder device, to know a unicast session intention of the responder device in advance, so as to make corresponding preparations in advance.

According to the first aspect or any one of the foregoing implementations of the first aspect, in a ninth possible implementation of the broadcast-based unicast session system, the at least one responder device further includes a second responder device. The initiator device receives a second unicast response message from the second responder device, where the second unicast response message includes a unicast service type responded by the second responder device, unicast service data responded by the second responder device, the first MAC identifier, a fifth extension identifier different from the first extension identifier, and a MAC identifier and an extension identifier of the second responder device; and sends a second unicast request message through periodic broadcast, where the second unicast request message includes the unicast service type requested by the initiator device of the unicast session, the unicast service data requested by the initiator device, and an updated MAC identifier and the first extension identifier of the initiator device, and the updated MAC identifier of the initiator device is different from the first MAC identifier. By identifying that the MAC identifier in the second unicast response message is consistent with the current MAC identifier of the initiator device, but the extension identifier does not belong to the initiator device, the initiator device finds that a MAC identifier conflict exists between different initiator devices. To avoid the conflict, the initiator device updates the MAC identifier of the initiator device, and uses the updated MAC identifier to send a new unicast request message.

According to the first aspect or any one of the foregoing implementations of the first aspect, in a ninth possible implementation of the broadcast-based unicast session system, if the first unicast acknowledgment message is not received within the remaining waiting time after the first responder device sends the first unicast response message, the first responder device re-sends the first unicast response message through broadcast. The robustness and reliability of the unicast session in the broadcast mechanism can be further improved through waiting time and timeout retransmission.

Optionally, when the first unicast response message is re-sent through broadcast, the second MAC identifier is no longer used as the MAC identifier of the responder device, but an updated MAC identifier is used as the MAC identifier of the responder device. This is because that the unicast acknowledgment message is not received due to timeout may be caused by a MAC identifier conflict between a plurality of responder devices. The MAC identifier of the responder device in the unicast response message is updated, so that a possibility of a successful unicast session in the broadcast mechanism can be increased.

According to a second aspect, a broadcast-based unicast session method is provided, including sending a first unicast request message through periodic broadcast, where the first unicast request message includes a unicast service type requested by an initiator device of the unicast session, unicast service data requested by the initiator device, and a first MAC identifier and a first extension identifier of the initiator device. The first MAC identifier is a dynamically updated identifier of the initiator device at a media access control layer, the first extension identifier is used to distinguish the initiator device from another initiator device, and the first extension identifier is different from the first MAC identifier. The method further includes receiving a first unicast response message sent by a first responder device through broadcast, where the first responder device is any one or a specific responder device in a network environment or system of the present application, and the first unicast response message includes a unicast service type responded by the first responder device, unicast service data responded by the first responder device, the first MAC identifier, the first extension identifier, and a second MAC identifier and a second extension identifier of the first responder device. The second MAC identifier is a dynamically updated identifier of the first responder device at the media access control layer, the second extension identifier is used to distinguish the first responder device from another responder device, and the second extension identifier is different from the second MAC identifier. The method further includes sending, in response to the received first unicast response message, a first unicast acknowledgment message through broadcast, where the first unicast acknowledgment message includes acknowledgment information of the unicast service data responded by the first responder device, the first MAC identifier, the first extension identifier, the second MAC identifier, and the second extension identifier.

The initiator device determines, by identifying that an MAC identifier of the initiator device in the first unicast response message is the first MAC identifier in the first unicast request message, and the extension identifier of the initiator device in the first unicast response message is the first extension identifier in the first unicast request message, that the first unicast response message is a response to the initiator device. Similarly, after receiving the first unicast acknowledgment message, the first responder device may determine, by identifying the first MAC identifier, the first extension identifier, the second MAC identifier, and the second extension identifier in the first unicast acknowledgment message, whether the received unicast acknowledgment message corresponds to the first unicast response message previously sent by the first responder device. Because a MAC identifier in a session message exchanged between an initiator and a responder through broadcast is dynamically updated, a MAC identifier conflict may occur. By adding an extension identifier used to identify a responder device or an initiator device to a unicast session message transmitted through broadcast, a session error caused by the MAC identifier conflict can be effectively avoided, and a unicast service can be implemented in a broadcast-based technical system.

The initiator device may be a roadside device, or may be an on-board terminal. When the initiator device is a roadside device, the first MAC identifier may be randomly selected within a limited value range, or may be allocated by a roadside operator. When the initiator device is an on-board terminal, the first MAC identifier may be randomly selected within a limited value range. Further, the first MAC identifier may change periodically.

The responder device may be a roadside device, or may be an on-board terminal. When the responder device is a roadside device, the first MAC identifier may be randomly selected within a limited value range, or may be allocated by a roadside operator. When the responder device is an on-board terminal, the first MAC identifier may be randomly selected within a limited value range. Further, the first MAC identifier may change periodically.

Optionally, the first MAC identifier is a random number generated by the initiator device.

Optionally, the second MAC identifier is a random number generated by the responder device.

Optionally, the first extension identifier or the second extension identifier is formed by at least one of a device hardware identifier, a device network access identifier, an electronic identity, an IMEI (International Mobile Equipment Identity), a VIN (Vehicle Identification Number), or spatial location identifier information, or is generated through mapping by using a function in which at least one of the foregoing identifiers is a parameter.

Optionally, the first extension identifier or the second extension identifier is generated as a random number.

Optionally, the first extension identifier or the second extension identifier is generated through manual setting.

Optionally, the first extension identifier or the second extension identifier is set at a DSMP protocol layer of a 4G V2X message.

Optionally, the first extension identifier or the second extension identifier is set in a message body of a message layer of a 4G V2X message.

According to the second aspect, in a first possible implementation of the broadcast-based unicast session method, the method further includes: receiving a second unicast response message sent by a second responder device through broadcast, where the second unicast response message includes a unicast service type responded by the second responder device, unicast service data responded by the second responder device, the first MAC identifier, the first extension identifier, and a third MAC identifier and a third extension identifier of the second responder device; and selecting, from a plurality of unicast response messages including the first unicast response message and the second unicast response message, at least one unicast response message including the first unicast response message as a responded unicast response message, where a MAC identifier of the initiator device included in each of the at least one unicast response message is the first MAC identifier, and an extension identifier of the initiator device included in each unicast response message is the first extension identifier. Because the first unicast request message is sent through broadcast, the first unicast request message may be received and responded by a plurality of responder devices. The initiator device may select, based on MAC identifiers and extension identifiers of the responder devices carried in a plurality of unicast response messages fed back by the plurality of responder devices, at least one responder device to establish a unicast session.

According to the second aspect or the first possible implementation of the second aspect, in a second possible implementation of the broadcast-based unicast session method, the at least one unicast response message used as the responded unicast response message further includes a third unicast response message sent by a third responder device through broadcast, where the third unicast response message includes a unicast service type responded by the third responder device, unicast service data responded by the third responder device, the first MAC identifier, the first extension identifier, a fourth MAC identifier and a fourth extension identifier of the third responder device. The method further includes receiving the third unicast response message sent by the third responder device through broadcast; and sending, in response to the third unicast response message, a second unicast acknowledgment message through broadcast, where the second unicast acknowledgment message includes acknowledgment information of the unicast service data responded by the third responder device, the first MAC identifier, the first extension identifier, the fourth MAC identifier, and the fourth extension identifier. When the initiator device is willing to separately establish a unicast session with a plurality of responder devices, the initiator device may separately perform a unicast session with each of the selected plurality of responder devices by sequentially sending a unicast acknowledgment message through broadcast.

According to the second aspect or any one of the foregoing implementations of the second aspect, in a third possible implementation of the broadcast-based unicast session method, the first unicast acknowledgment message includes a message layer and a radio link control layer, content information of the first unicast acknowledgment message at the radio link control layer is carried by a data packet, and the message layer of the first unicast acknowledgment message includes information used to indicate an attribute of a unicast message. The message layer indicates a unicast service to the RLC layer, so that a unicast service data packet is not segmented at the RLC layer, and it is ensured that the data packet can be parsed even if a MAC identifier conflict occurs, thereby further improving reliability of performing the unicast session through broadcast.

According to the second aspect or any one of the foregoing implementations of the second aspect, in a fourth possible implementation of the broadcast-based unicast session method, the first unicast request message further includes first sending indication information, used to indicate at least one of a quantity of times of repeated sending or a repeated sending interval of the first unicast response message. The initiator device may indicate, to the responder by carrying the indication information in the unicast request message, a manner of sending the unicast response message returned for the unicast request message.

According to the second aspect or any one of the foregoing implementations of the second aspect, in a fifth possible implementation of the broadcast-based unicast session method, sending the first unicast acknowledgment message through broadcast is repeatedly sending the first unicast acknowledgment message through broadcast, and the first unicast response message further includes second sending indication information, used to indicate at least one of a quantity of times of repeated sending, a repeated sending interval, or remaining waiting time of the first unicast acknowledgment message. Repeatedly sending the first unicast acknowledgment message through broadcast can further improve robustness and reliability of the broadcast-based unicast session system. The responder device may indicate, to the initiator by carrying the indication information in the unicast response message, a manner of sending the unicast acknowledgment message returned for the unicast response message.

According to the second aspect or any one of the foregoing implementations of the second aspect, in a sixth possible implementation of the broadcast-based unicast session method, at least one of an actual quantity of times of repeated sending or an actual repeated sending interval of the first unicast acknowledgment message is determined based on the second sending indication information. In addition, even if the responder device indicates, in the unicast response message, the manner of sending the unicast acknowledgment message to the initiator device, the initiator may still not follow the indication information, but for example, determine the manner based on service load or a service priority, a channel status, reliability of a unicast service, or a delay requirement of the initiator device.

According to the second aspect or any one of the foregoing implementations of the second aspect, in a seventh possible implementation of the broadcast-based unicast session method, the first unicast request message further includes the second MAC identifier and the second extension identifier. In other words, the initiator device may invite a specific device to perform a unicast session through broadcast, provided that a MAC identifier and an extension identifier of the invited responder device are set in the unicast request message. For example, in this implementation, the first unicast request message carries the second MAC identifier and the second extension identifier, to indicate to all receiving devices of the first unicast request message, that a device that the initiator device intends to establish a unicast session with is the first responder device to which the second MAC identifier and the second extension identifier belong. According to this implementation, after receiving the first unicast request message, another device may determine, by identifying the MAC identifier and the extension identifier of the responder device in the first unicast request message, that the responder device requested by the initiator device is not the another device, so that no response is made, thereby avoiding a waste of communication resources. On another hand, after receiving the first unicast request message, the first responder device may determine, by identifying the MAC identifier and the extension identifier of the responder device in the first unicast request message, that the responder device requested by the initiator device is the first responder device, to know a unicast session intention of the responder device in advance, so as to make corresponding preparations in advance.

According to the second aspect or any one of the foregoing implementations of the second aspect, in an eighth possible implementation of the broadcast-based unicast session method, the method further includes: receiving the second unicast response message from the second responder device, where the second unicast response message includes a unicast service type responded by the second responder device, unicast service data responded by the second responder device, the first MAC identifier, a fifth extension identifier different from the first extension identifier, and a MAC identifier and an extension identifier of the second responder device; and sending a second unicast request message through periodic broadcast, where the second unicast request message includes the unicast service type requested by the initiator device of the unicast session, the unicast service data requested by the initiator device, and an updated MAC identifier and the first extension identifier of the initiator device, and the updated MAC identifier of the initiator device is different from the first MAC identifier. By identifying that the MAC identifier in the second unicast response message is consistent with the current MAC identifier of the initiator device, but the extension identifier does not belong to the initiator device, the initiator device finds that a MAC identifier conflict exists between different initiator devices. To avoid the conflict, the initiator device updates the MAC identifier of the initiator device, and uses the updated MAC identifier to send a new unicast request message.

According to a third aspect, a broadcast-based unicast session method is provided, including receiving a first unicast request message sent by an initiator device of a unicast session through periodic broadcast, where the first unicast request message includes a unicast service type requested by the initiator device, unicast service data requested by the initiator device, and a first MAC identifier and a first extension identifier of the initiator device. The first MAC identifier is a dynamically updated identifier of the initiator device at a media access control layer, the first extension identifier is used to distinguish the initiator device from another initiator device, and the first extension identifier is different from the first MAC identifier. The method further includes sending, in response to the received first unicast request message, a first unicast response message through broadcast, where the first unicast response message includes a unicast service type responded by a first responder device of the unicast session, unicast service data responded by the first responder device, the first MAC identifier, the first extension identifier, and a second MAC identifier and a second extension identifier of the first responder device. The first responder device is any one or a specific responder device in a network environment or system of the present application, the second MAC identifier is a dynamically updated identifier of the first responder device at the media access control layer, the second extension identifier is used to distinguish the first responder device from another responder device, and the second extension identifier is different from the second MAC identifier. The method further includes receiving a first unicast acknowledgment message from the initiator device, where the first unicast acknowledgment message includes acknowledgment information of the unicast service data responded by the first responder device, the first MAC identifier, the first extension identifier, the second MAC identifier, and the second extension identifier; and performing service processing related to the unicast session based on the first unicast acknowledgment message. The service processing related to the unicast session is service processing related to the unicast service type and the unicast service data that are in the first unicast response message. For example, in a vehicle near field payment scenario, the initiator device is a roadside toll collection device, and the responder device is a vehicle. After receiving a unicast acknowledgment message that is related to a payment service and that is from the roadside toll collection device, the vehicle performs service processing related to fee payment. For another example, in a vehicle platoon driving scenario, the initiator device is a first vehicle, and the responder device is a second vehicle. After receiving a unicast acknowledgment message that is from the first vehicle and that is related to platoon summoning, the second vehicle performs service processing of forming a vehicle platoon with the first vehicle.

The first responder device identifies, an identity of the initiator device by using the MAC identifier and the extension identifier of the initiator device in the first unicast request message, to determine whether the first responder device establishes a unicast session with the initiator device through broadcast. If the first responder device establishes a unicast session with the initiator device through broadcast, the first responder device sends the first unicast response message through broadcast. On one hand, the first unicast response message carries the MAC identifier and the extension identifier of the initiator device to indicate a correspondence between the first unicast response message and the first unicast request message. On another hand, the first unicast response message carries the MAC identifier and the extension identifier of the initiator device to express the intention of establishing a unicast session through broadcast to the initiator device. Because a MAC identifier in a session message exchanged between an initiator and a responder through broadcast is dynamically updated, a MAC identifier conflict may occur. By adding an extension identifier used to identify a responder device or an initiator device to a unicast session message transmitted through broadcast, a session error caused by the MAC identifier conflict can be effectively avoided, and a unicast service can be implemented in a broadcast-based technical system.

The initiator device may be a roadside device, or may be an on-board terminal. When the initiator device is a roadside device, the first MAC identifier may be randomly selected within a limited value range, or may be allocated by a roadside operator. When the initiator device is an on-board terminal, the first MAC identifier may be randomly selected within a limited value range. Further, the first MAC identifier may change periodically.

The responder device may be a roadside device, or may be an on-board terminal. When the responder device is a roadside device, the first MAC identifier may be randomly selected within a limited value range, or may be allocated by a roadside operator. When the responder device is an on-board terminal, the first MAC identifier may be randomly selected within a limited value range. Further, the first MAC identifier may change periodically.

Optionally, the first MAC identifier is a random number generated by the initiator device.

Optionally, the second MAC identifier is a random number generated by the responder device.

Optionally, the first extension identifier or the second extension identifier is formed by at least one of a device hardware identifier, a device network access identifier, an electronic identity, an IMEI (International Mobile Equipment Identity), a VIN (Vehicle Identification Number), or spatial location identifier information, or is generated through mapping by using a function in which at least one of the foregoing identifiers is a parameter.

Optionally, the first extension identifier or the second extension identifier is generated as a random number.

Optionally, the first extension identifier or the second extension identifier is generated through manual setting.

Optionally, the first extension identifier or the second extension identifier is set at a DSMP protocol layer of a 4G V2X message.

Optionally, the first extension identifier or the second extension identifier is set in a message body of a message layer of a 4G V2X message.

According to the third aspect, in a first possible implementation of the broadcast-based unicast session method, the first unicast response message includes a message layer and a radio link control layer, content information of the first unicast response message at the radio link control layer is carried by a data packet, and the message layer of the first unicast response message includes information used to indicate an attribute of a unicast message. The message layer indicates a unicast service to the RLC layer, so that a unicast service data packet is not segmented at the RLC layer, and it is ensured that the data packet can be parsed even if a MAC identifier conflict occurs, thereby further improving reliability of performing the unicast session through broadcast.

According to the third aspect or the first possible implementation of the third aspect, in a second possible implementation of the broadcast-based unicast session method, the sending the first unicast response message through broadcast is repeatedly sending the first unicast response message through broadcast, and the first unicast request message further includes first sending indication information, used to indicate at least one of a quantity of times of repeated sending or a repeated sending interval of the first unicast response message. Repeatedly sending the first unicast response message through broadcast can further improve robustness and reliability of the broadcast-based unicast session system. The initiator device may indicate, to the responder by carrying the indication information in the unicast request message, a manner of sending the unicast response message returned for the unicast request message.

According to the third aspect or any one of the foregoing implementations of the third aspect, in a third possible implementation of the broadcast-based unicast session method, at least one of an actual quantity of times of repeated sending or an actual repeated sending interval of the first unicast response message is determined based on the first sending indication information. In addition, even if the initiator device indicates, in the unicast request message, the manner of sending the unicast response message to the responder device, the responder may still not follow the indication information, but for example, determine the manner based on service load or a service priority, a channel status, reliability of a unicast service, or a delay requirement of the responder device.

According to the third aspect or any one of the foregoing implementations of the third aspect, in a fourth possible implementation of the broadcast-based unicast session method, the first unicast response message further includes second sending indication information, used to indicate at least one of a quantity of times of repeated sending, a repeated sending interval, or remaining waiting time of the first unicast acknowledgment message. The responder device may indicate, to the initiator by carrying the indication information in the unicast response message, a manner of sending the unicast acknowledgment message returned for the unicast response message.

According to the third aspect or any one of the foregoing implementations of the third aspect, in a fifth possible implementation of the broadcast-based unicast session method, the method further includes starting from sending the first unicast response message, if the first unicast acknowledgment message is not received within the remaining waiting time, re-sending the first unicast response message through broadcast. The robustness and reliability of the unicast session in the broadcast mechanism can be further improved through waiting time and timeout retransmission.

Optionally, when the first unicast response message is re-sent through broadcast, the second MAC identifier is no longer used as the MAC identifier of the responder device, but an updated MAC identifier is used as the MAC identifier of the responder device. This is because that the unicast acknowledgment message is not received due to timeout may be caused by a MAC identifier conflict of a plurality of responder devices. The MAC identifier of the responder device in the unicast response message is updated, so that a possibility of a successful unicast session in the broadcast mechanism can be increased.

According to the third aspect or any one of the foregoing implementations of the third aspect, in a sixth possible implementation of the broadcast-based unicast session method, the first unicast request message further includes the second MAC identifier and the second extension identifier; and the sending a first unicast response message through broadcast includes: in a case in which the second MAC identifier in the first unicast request message is the same as a current MAC identifier of the first responder device, and the second extension identifier in the first unicast request message is the same as an extension identifier of the first responder device, sending the first unicast response message through broadcast. The initiator device may invite a specific device to perform a unicast session through broadcast, provided that a MAC identifier and an extension identifier of the invited responder device are set in the unicast request message. For example, in this implementation, the first unicast request message includes the second MAC identifier and the second extension identifier, to indicate to all receiving devices of the first unicast request message, that a device that the initiator device intends to establish a unicast session with is the first responder device to which the second MAC identifier and the second extension identifier belong. According to this implementation, after receiving the first unicast request message, another device may determine, by identifying the MAC identifier and the extension identifier of the responder device in the first unicast request message, that the responder device requested by the initiator device is not the another device, so that no response is made, thereby avoiding a waste of communication resources. On another hand, after receiving the first unicast request message, the first responder device may determine, by identifying the MAC identifier and the extension identifier of the responder device in the first unicast request message, that the responder device requested by the initiator device is the first responder device, to know a unicast session intention of the responder device in advance, so as to make corresponding feedback and preparations in advance.

According to a fourth aspect, a broadcast-based unicast session apparatus is provided, including a sending unit, configured to send a first unicast request message through periodic broadcast, where the first unicast request message includes a unicast service type requested by an initiator device of the unicast session, unicast service data requested by the initiator device, and a first MAC identifier and a first extension identifier of the initiator device. The first MAC identifier is a dynamically updated identifier of the initiator device at a media access control layer, the first extension identifier is used to distinguish the initiator device from another initiator device, and the first extension identifier is different from the first MAC identifier. The apparatus further includes a receiving unit, configured to receive a first unicast response message sent by a first responder device through broadcast, where the first responder device is any one or a specific responder device in a network environment or system of the present application, and the first unicast response message includes a unicast service type responded by the first responder device, unicast service data responded by the first responder device, the first MAC identifier, the first extension identifier, and a second MAC identifier and a second extension identifier of the first responder device. The second MAC identifier is a dynamically updated identifier of the first responder device at the media access control layer, the second extension identifier is used to distinguish the first responder device from another responder device, and the second extension identifier is different from the second MAC identifier. The sending unit is further configured to send, in response to the received first unicast response message, a first unicast acknowledgment message through broadcast, where the first unicast acknowledgment message includes acknowledgment information of the unicast service data responded by the first responder device, the first MAC identifier, the first extension identifier, the second MAC identifier, and the second extension identifier. The broadcast-based unicast session apparatus may be an initiator device itself, or an internal component of the initiator device. Because the initiator device may be a roadside device or an on-board terminal, the broadcast-based unicast session apparatus includes but is not limited to a vehicle, a component in a vehicle, a roadside unit device, or a component in a roadside unit device.

The initiator device determines, by identifying that a MAC identifier of the initiator device in the first unicast response message is the first MAC identifier in the first unicast request message, and the extension identifier of the initiator device in the first unicast response message is the first extension identifier in the first unicast request message, that the first unicast response message is a response to the initiator device. Similarly, after receiving the first unicast acknowledgment message, the first responder device may determine, by identifying the first MAC identifier, the first extension identifier, the second MAC identifier, and the second extension identifier in the first unicast acknowledgment message, whether the received unicast acknowledgment message corresponds to the first unicast response message previously sent by the first responder device. Because a MAC identifier in a session message exchanged between an initiator and a responder through broadcast is dynamically updated, a MAC identifier conflict may occur. By adding an extension identifier used to identify a responder device or an initiator device to a unicast session message transmitted through broadcast, a session error caused by the MAC identifier conflict can be effectively avoided, and a unicast service can be implemented in a broadcast-based technical system.

The initiator device may be a roadside device, or may be an on-board terminal. When the initiator device is a roadside device, the first MAC identifier may be randomly selected within a limited value range, or may be allocated by a roadside operator. When the initiator device is an on-board terminal, the first MAC identifier may be randomly selected within a limited value range. Further, the first MAC identifier may change periodically.

The responder device may be a roadside device, or may be an on-board terminal. When the responder device is a roadside device, the first MAC identifier may be randomly selected within a limited value range, or may be allocated by a roadside operator. When the responder device is an on-board terminal, the first MAC identifier may be randomly selected within a limited value range. Further, the first MAC identifier may change periodically.

Optionally, the first MAC identifier is a random number generated by the initiator device.

Optionally, the second MAC identifier is a random number generated by the responder device.

Optionally, the first extension identifier or the second extension identifier is formed by at least one of a device hardware identifier, a device network access identifier, an electronic identity, an IMEI (International Mobile Equipment Identity), a VIN (Vehicle Identification Number), or spatial location identifier information, or is generated through mapping by using a function in which at least one of the foregoing identifiers is a parameter.

Optionally, the first extension identifier or the second extension identifier is generated as a random number.

Optionally, the first extension identifier or the second extension identifier is generated through manual setting.

Optionally, the first extension identifier or the second extension identifier is set at a DSMP protocol layer of a 4G V2X message.

Optionally, the first extension identifier or the second extension identifier is set in a message body of a message layer of a 4G V2X message.

According to the fourth aspect, in a first possible implementation of the broadcast-based unicast session apparatus, the receiving unit is further configured to receive a second unicast response message sent by a second responder device through broadcast, where the second unicast response message includes a unicast service type responded by the second responder device, unicast service data responded by the second responder device, the first MAC identifier, the first extension identifier, and a third MAC identifier and a third extension identifier of the second responder device. The apparatus further includes a processing unit, configured to select, from a plurality of unicast response messages including the first unicast response message and the second unicast response message, at least one unicast response message including the first unicast response message as a responded unicast response message, where a MAC identifier of the initiator device included in each of the at least one unicast response message is the first MAC identifier, and an extension identifier of the initiator device included in each unicast response message is the first extension identifier. Because the first unicast request message is sent through broadcast, the first unicast request message may be received and responded by a plurality of responder devices. The initiator device may select, based on MAC identifiers and extension identifiers of the responder devices carried in a plurality of unicast response messages fed back by the plurality of responder devices, at least one responder device to establish a unicast session.

According to the fourth aspect or the first possible implementation of the fourth aspect, in a second possible implementation of the broadcast-based unicast session apparatus, the at least one unicast response message used as the responded unicast response message further includes a third unicast response message sent by a third responder device through broadcast, where the third unicast response message includes a unicast service type responded by the third responder device, unicast service data responded by the third responder device, the first MAC identifier, the first extension identifier, and a fourth MAC identifier and a fourth extension identifier of the third responder device. The receiving apparatus is further configured to receive the third unicast response message sent by the third responder device through broadcast. The sending apparatus is further configured to send, in response to the third unicast response message, a second unicast acknowledgment message through broadcast, where the second unicast acknowledgment message includes acknowledgment information of the unicast service data responded by the third responder device, the first MAC identifier, the first extension identifier, the fourth MAC identifier, and the fourth extension identifier.

According to the fourth aspect or any one of the foregoing implementations of the fourth aspect, in a third possible implementation of the broadcast-based unicast session apparatus, the first unicast acknowledgment message includes a message layer and a radio link control layer, content information of the first unicast acknowledgment message at the radio link control layer is carried by a data packet, and the message layer of the first unicast acknowledgment message includes information used to indicate an attribute of a unicast message. The message layer indicates a unicast service to the RLC layer, so that the unicast service data packet is not segmented at the RLC layer, and it is ensured that the data packet can be parsed even if a MAC identifier conflict occurs, thereby further improving reliability of performing the unicast session through broadcast.

According to the fourth aspect or any one of the foregoing implementations of the fourth aspect, in a fourth possible implementation of the broadcast-based unicast session apparatus, the first unicast request message further includes first sending indication information, used to indicate at least one of a quantity of times of repeated sending or a repeated sending interval of the first unicast response message. The initiator device may indicate, to the responder by carrying the indication information in the unicast request message, a manner of sending the unicast response message returned for the unicast request message.

According to the fourth aspect or any one of the foregoing implementations of the fourth aspect, in a fifth possible implementation of the broadcast-based unicast session apparatus, the sending the first unicast acknowledgment message through broadcast is repeatedly sending the first unicast acknowledgment message through broadcast, and the first unicast response message further includes second sending indication information, used to indicate at least one of a quantity of times of repeated sending, a repeated sending interval, or remaining waiting time of the first unicast acknowledgment message. Repeatedly sending the first unicast acknowledgment message through broadcast can further improve robustness and reliability of the broadcast-based unicast session system. The responder device may indicate, to the initiator by carrying the indication information in the unicast response message, a manner of sending the unicast acknowledgment message returned for the unicast response message.

According to the fourth aspect or any one of the foregoing implementations of the fourth aspect, in a sixth possible implementation of the broadcast-based unicast session apparatus, at least one of an actual quantity of times of repeated sending or an actual repeated sending interval of the first unicast acknowledgment message is determined based on the second sending indication information. In addition, even if the responder device indicates, in the unicast response message, the manner of sending the unicast acknowledgment message to the initiator device, the initiator may still not follow the indication information, but for example, determine the manner based on service load or a service priority, a channel status, reliability of a unicast service, or a delay requirement of the initiator device.

According to the fourth aspect or any one of the foregoing implementations of the fourth aspect, in a seventh possible implementation of the broadcast-based unicast session apparatus, the first unicast request message further includes the second MAC identifier and the second extension identifier. In other words, the initiator device may invite a specific device to perform a unicast session through broadcast, provided a MAC identifier and an extension identifier of the invited responder device are set in the unicast request message. For example, in this implementation, the first unicast request message carries the second MAC identifier and the second extension identifier, to indicate to all receiving devices of the first unicast request message, that a device that the initiator device intends to establish a unicast session with is the first responder device to which the second MAC identifier and the second extension identifier belong. According to this implementation, after receiving the first unicast request message, another device may determine, by identifying the MAC identifier and the extension identifier of the responder device in the first unicast request message, that the responder device requested by the initiator device is not the another device, so that no response is made, thereby avoiding a waste of communication resources. On another hand, after receiving the first unicast request message, the first responder device may determine, by identifying the MAC identifier and the extension identifier of the responder device in the first unicast request message, that the responder device requested by the initiator device is the first responder device, to know a unicast session intention of the responder device in advance, so as to make corresponding preparations in advance.

According to the fourth aspect or any one of the foregoing implementations of the fourth aspect, in an eighth possible implementation of the broadcast-based unicast session apparatus, the receiving unit is further configured to receive the second unicast response message from the second responder device, where the second unicast response message includes a unicast service type responded by the second responder device, unicast service data responded by the second responder device, the first MAC identifier, a fifth extension identifier different from the first extension identifier, and a MAC identifier and an extension identifier of the second responder device. The sending unit is further configured to send a second unicast request message through periodic broadcast, where the second unicast request message includes the unicast service type requested by the initiator device of the unicast session, the unicast service data requested by the initiator device, and an updated MAC identifier and the first extension identifier of the initiator device, and the updated MAC identifier of the initiator device is different from the first MAC identifier. By identifying that the MAC identifier in the second unicast response message is consistent with the current MAC identifier of the initiator device, but the extension identifier does not belong to the initiator device, the initiator device finds that a MAC identifier conflict exists between different initiator devices. To avoid the conflict, the initiator device updates the MAC identifier of the initiator device, and uses the updated MAC identifier to send a new unicast request message.

According to a fifth aspect, a broadcast-based unicast session apparatus is provided, including a receiving unit, configured to receive a first unicast request message sent by an initiator device of a unicast session through periodic broadcast, where the first unicast request message includes a unicast service type requested by the initiator device, unicast service data requested by the initiator device, and a first MAC identifier and a first extension identifier of the initiator device. The first MAC identifier is a dynamically updated identifier of the initiator device at a media access control layer, the first extension identifier is used to distinguish the initiator device from another initiator device, and the first extension identifier is different from the first MAC identifier. The apparatus further includes a sending unit, configured to send, in response to the received first unicast request message, a first unicast response message through broadcast, where the first unicast response message includes a unicast service type responded by a first responder device of the unicast session, unicast service data responded by the first responder device, the first MAC identifier, the first extension identifier, and a second MAC identifier and a second extension identifier of the first responder device. The first responder device is any one or a specific responder device in a network environment or system of the present application, the second MAC identifier is a dynamically updated identifier of the first responder device at the media access control layer, the second extension identifier is used to distinguish the first responder device from another responder device, and the second extension identifier is different from the second MAC identifier. The receiving unit is further configured to receive a first unicast acknowledgment message from the initiator device, where the first unicast acknowledgment message includes acknowledgment information of the unicast service data responded by the first responder device, the first MAC identifier, the first extension identifier, the second MAC identifier, and the second extension identifier. The apparatus further includes a processing unit, configured to perform service processing related to the unicast session based on the first unicast acknowledgment message. The service processing related to the unicast session is service processing related to the unicast service type and the unicast service data that are in the first unicast response message. For example, in a vehicle near field payment scenario, the initiator device is a roadside toll collection device, and the responder device is a vehicle. After receiving a unicast acknowledgment message that is related to a payment service and that is from the roadside toll collection device, the vehicle performs service processing related to fee payment. For another example, in a vehicle platoon driving scenario, the initiator device is a first vehicle, and the responder device is a second vehicle. After receiving a unicast acknowledgment message that is from the first vehicle and that is related to platoon summoning, the second vehicle performs service processing of forming a vehicle platoon with the first vehicle.

The first responder device identifies, an identity of the initiator device by using the MAC identifier and the extension identifier of the initiator device in the first unicast request message, to determine whether the first responder device establishes a unicast session with the initiator device through broadcast. If the first responder device establishes a unicast session with the initiator device through broadcast, the first responder device sends the first unicast response message through broadcast. On one hand, the first unicast response message carries the MAC identifier and the extension identifier of the initiator device to indicate a correspondence between the first unicast response message and the first unicast request message. On another hand, the first unicast response message carries the MAC identifier and the extension identifier of the initiator device to express the intention of establishing a unicast session through broadcast to the initiator device. Because a MAC identifier in a session message exchanged between an initiator and a responder through broadcast is dynamically updated, a MAC identifier conflict may occur. By adding an extension identifier used to identify a responder device or an initiator device to a unicast session message transmitted through broadcast, a session error caused by the MAC identifier conflict can be effectively avoided, and a unicast service can be implemented in a broadcast-based technical system.

The initiator device may be a roadside device, or may be an on-board terminal. When the initiator device is a roadside device, the first MAC identifier may be randomly selected within a limited value range, or may be allocated by a roadside operator. When the initiator device is an on-board terminal, the first MAC identifier may be randomly selected within a limited value range. Further, the first MAC identifier may change periodically.

The responder device may be a roadside device, or may be an on-board terminal. When the responder device is a roadside device, the first MAC identifier may be randomly selected within a limited value range, or may be allocated by a roadside operator. When the responder device is an on-board terminal, the first MAC identifier may be randomly selected within a limited value range. Further, the first MAC identifier may change periodically.

Optionally, the first MAC identifier is a random number generated by the initiator device.

Optionally, the second MAC identifier is a random number generated by the responder device.

Optionally, the first extension identifier or the second extension identifier is formed by at least one of a device hardware identifier, a device network access identifier, an electronic identity, an IMEI (International Mobile Equipment Identity), a VIN (Vehicle Identification Number), or spatial location identifier information, or is generated through mapping by using a function in which at least one of the foregoing identifiers is a parameter.

Optionally, the first extension identifier or the second extension identifier is generated as a random number.

Optionally, the first extension identifier or the second extension identifier is generated through manual setting.

Optionally, the first extension identifier or the second extension identifier is set at a DSMP protocol layer of a 4G V2X message.

Optionally, the first extension identifier or the second extension identifier is set in a message body of a message layer of a 4G V2X message.

According to the fifth aspect, in a first possible implementation of the broadcast-based unicast session apparatus, the first unicast response message includes a message layer and a radio link control layer, content information of the first unicast response message at the radio link control layer is carried by a data packet, and the message layer of the first unicast response message includes information used to indicate an attribute of a unicast message. The message layer indicates a unicast service to the RLC layer, so that the unicast service data packet is not segmented at the RLC layer, and it is ensured that the data packet can be parsed even if a MAC identifier conflict occurs, thereby further improving reliability of performing the unicast session through broadcast.

It should be noted that the foregoing manner of indicating the unicast service to the RLC layer via the message layer is not limited to being applied to the first unicast response message or the first unicast acknowledgment message, but may also be applied to any other unicast response message or any other unicast acknowledgment message in the implementations of the present application.

According to the fifth aspect or the first possible implementation of the fifth aspect, in a second possible implementation of the broadcast-based unicast session apparatus, the sending the first unicast response message through broadcast is repeatedly sending the first unicast response message through broadcast, and the first unicast request message further includes first sending indication information, used to indicate at least one of a quantity of times of repeated sending or a repeated sending interval of the first unicast response message. Repeatedly sending the first unicast response message through broadcast can further improve robustness and reliability of the broadcast-based unicast session system. The initiator device may indicate, to the responder by carrying the indication information in the unicast request message, a manner of sending the unicast response message returned for the unicast request message.

According to the fifth aspect or any one of the foregoing implementations of the fifth aspect, in a third possible implementation of the broadcast-based unicast session apparatus, at least one of an actual quantity of times of repeated sending or an actual repeated sending interval of the first unicast response message is determined based on the first sending indication information. In addition, even if the initiator device indicates, in the unicast request message, the manner of sending the unicast response message to the responder device, the responder may still not follow the indication information, but for example, determine the manner based on service load or a service priority, a channel status, reliability of a unicast service, or a delay requirement of the responder device.

According to the fifth aspect or any one of the foregoing implementations of the fifth aspect, in a fourth possible implementation of the broadcast-based unicast session apparatus, the first unicast response message further includes second sending indication information, used to indicate at least one of a quantity of times of repeated sending, a repeated sending interval, or remaining waiting time of the first unicast acknowledgment message. The responder device may indicate, to the initiator by carrying the indication information in the unicast response message, a manner of sending the unicast acknowledgment message returned for the unicast response message.

According to the fifth aspect or any one of the foregoing implementations of the fifth aspect, in a fifth possible implementation of the broadcast-based unicast session apparatus, the sending unit is further configured to: starting from sending the first unicast response message, if the first unicast acknowledgment message is not received within the remaining waiting time, re-send the first unicast response message through broadcast. The robustness and reliability of the unicast session in the broadcast mechanism can be further improved through waiting time and timeout retransmission.

Optionally, in the sending the first unicast response message through broadcast, the second MAC identifier is no longer used as the MAC identifier of the responder device, but an updated MAC identifier is used as the MAC identifier of the responder device. This is because that the unicast acknowledgment message is not received due to timeout may be caused by a MAC identifier conflict of a plurality of responder devices. The MAC identifier of the responder device in the unicast response message is updated, so that a possibility of a successful unicast session in the broadcast mechanism can be increased.

According to the fifth aspect or any one of the foregoing implementations of the fifth aspect, in a sixth possible implementation of the broadcast-based unicast session apparatus, the first unicast request message further includes the second MAC identifier and the second extension identifier; and sending the first unicast response message through broadcast includes: when the second MAC identifier in the first unicast request message is the same as a current MAC identifier of the first responder device, and the second extension identifier in the first unicast request message is the same as an extension identifier of the first responder device, sending the first unicast response message through broadcast. The initiator device may invite a specific device to perform a unicast session through broadcast, provided a MAC identifier and an extension identifier of the invited responder device are set in the unicast request message. For example, in this implementation, the first unicast request message includes the second MAC identifier and the second extension identifier, to indicate to all receiving devices of the first unicast request message, that a device that the initiator device intends to establish a unicast session with is the first responder device to which the second MAC identifier and the second extension identifier belong. According to this implementation, after receiving the first unicast request message, another device may determine, by identifying the MAC identifier and the extension identifier of the responder device in the first unicast request message, that the responder device requested by the initiator device is not the another device, so that no response is made, thereby avoiding a waste of communication resources. On another hand, after receiving the first unicast request message, the first responder device may determine, by identifying the MAC identifier and the extension identifier of the responder device in the first unicast request message, that the responder device requested by the initiator device is the first responder device, to know a unicast session intention of the responder device in advance, so as to corresponding feedback and preparations in advance.

According to a sixth aspect, a broadcast-based unicast session apparatus is provided, including a memory and a processor, where the memory stores a computer program instruction, and the processor runs the computer program instruction to perform the broadcast-based unicast session method according to any one of the second aspect or the foregoing implementations of the second aspect. The broadcast-based unicast session apparatus may be located on a road side, or may be located on a vehicle side. Specifically, the broadcast-based unicast session apparatus includes but is not limited to a vehicle, a component in a vehicle, a roadside unit device, or a component in a roadside unit device.

According to a seventh aspect, a broadcast-based unicast session apparatus is provided, including a memory and a processor, where the memory stores a computer program instruction, and the processor runs the computer program instruction to perform the broadcast-based unicast session method according to any one of the third aspect or the foregoing implementations of the third aspect. The broadcast-based unicast session apparatus may be located on a road side, or may be located on a vehicle side. Specifically, the broadcast-based unicast session apparatus includes but is not limited to a vehicle, a component in a vehicle, a roadside unit device, or a component in a roadside unit device.

According to an eighth aspect, a computer storage medium is provided, including a computer instruction, where when the computer instruction is run by a processor, the broadcast-based unicast session apparatus is enabled to perform the method according to any one of the second aspect or the foregoing implementations of the second aspect.

According to a ninth aspect, a computer storage medium is provided, including a computer instruction, where when the computer instruction is run by a processor, the broadcast-based unicast session apparatus is enabled to perform the method according to any one of the third aspect or the foregoing implementations of the third aspect.

According to a tenth aspect, a vehicle is provided, including the apparatus according to any one of the fourth aspect or the foregoing implementations of the fourth aspect, and the apparatus according to any one of the fifth aspect or the foregoing implementations of the fifth aspect.

According to an eleventh aspect, a vehicle is provided, including the apparatus according to any one of the sixth aspect or the foregoing implementations of the sixth aspect, and the apparatus according to any one of the seventh aspect or the foregoing implementations of the seventh aspect.

According to a twelfth aspect, a computer program product is provided. When the computer program product is run on a processor, the broadcast-based unicast session apparatus is enabled to perform the method according to any one of the second aspect or the foregoing implementations of the second aspect.

According to a thirteenth aspect, a computer program product is provided. When the computer program product is run on a processor, the broadcast-based unicast session apparatus is enabled to perform the method in any one of the third aspect or the foregoing implementations of the third aspect.

DESCRIPTION OF EMBODIMENTS

To make the objectives, technical solutions, and advantages of embodiments of the present application clearer, the following clearly describes the technical solutions in embodiments of the present application with reference to the accompanying drawings in embodiments of the present application. It is clear that the described embodiments are some but not all of embodiments of the present application. All other embodiments obtained by a person of ordinary skill in the art based on embodiments of the present application without creative efforts shall fall within the protection scope of the present application.

Figure 1:
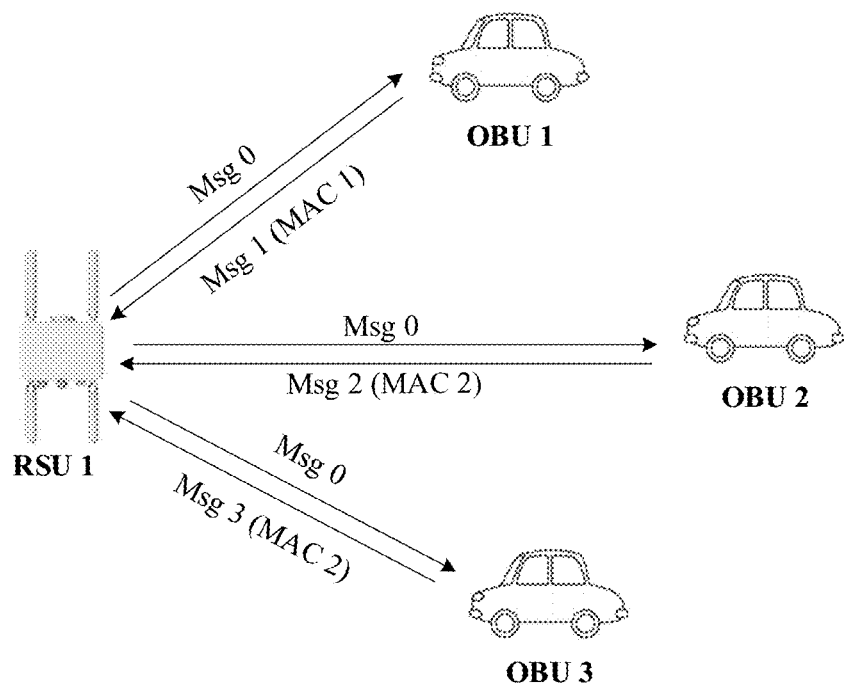
FIG. 1 is a schematic diagram of a 4G V2X broadcast-based technical system.
Figure 2A:
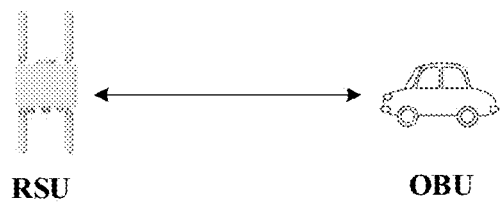
FIG. 2(*a*) and FIG. 2(*b*) are schematic diagrams of two typical application scenarios according to an embodiment of the present application.
Figure 2B:
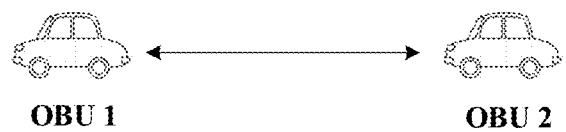

FIG. 2(*a*) and FIG. 2(*b*) are schematic diagrams of two typical application scenarios according to an embodiment of the present application. Embodiments of the present application may be applied to, but are not limited to, message exchange between an RSU and an OBU, between OBUs, or between RSUs through a wireless communication channel. The wireless communication channel includes but is not limited to a wireless communication channel in a form of 2G (second generation mobile communication technology), 3G (third generation mobile communication technology), 4G (fourth generation mobile communication technology), 5G (fifth generation mobile communication technology), Wi-Fi (Wireless Fidelity), WiMAX (Worldwide Interoperability for Microwave Access), Bluetooth (Bluetooth communication technology), ZigBee (ZigBee communication technology), optical transmission, satellite communications, infrared communications, or the like. The RSU includes but is not limited to a vehicle-to-everything device that is installed on a road or a parking lot and that has a short-distance communication function, and may implement vehicle identity identification, electronic deduction, or electronic payment. The RSU can be connected to conventional intelligent transportation facilities such as various traffic lights, camera detectors, microwave detectors, and variable information boards, and may further access new traffic information sources such as a ground-based differential and a weather service based on an edge computing architecture. In this way, comprehensive roadside intelligent network services covering driving safety, efficiency, and information services are provided. The OBU includes but is not limited to a vehicle, an in-vehicle component, or an in-vehicle subsystem, for example, a central gateway, a T-box (Telematics BOX), a human-machine interactive controller (HMI), a mobile data center (MDC, Mobile Data Controller), an advanced driving assistant system (ADAS), or a plurality of electronic control units (ECU).

Figure 3:
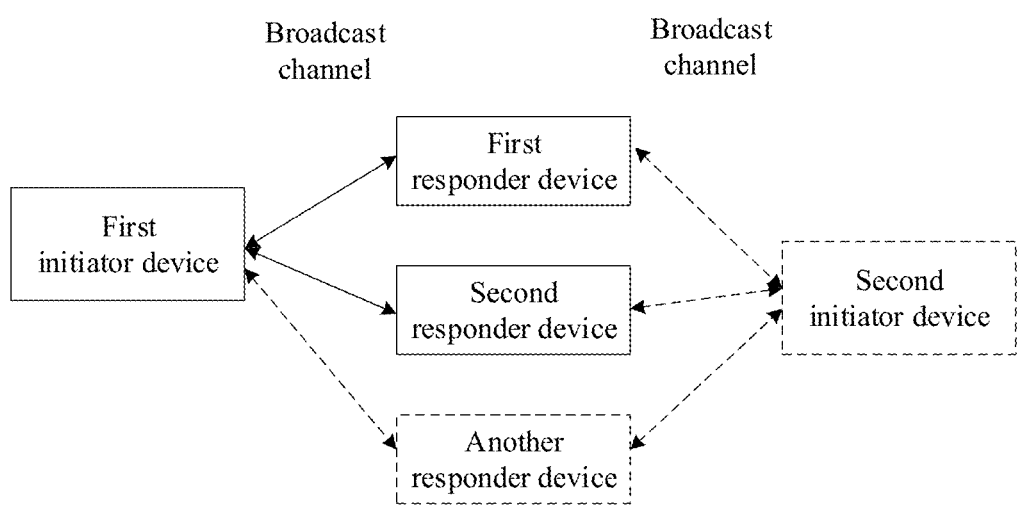
FIG. 3 is a structural block diagram of a broadcast-based unicast session system according to Embodiment 1 of the present application.

Embodiment 1 of the present application provides a broadcast-based unicast session system, as shown in FIG. 3. The system is in an environment that can be covered by a broadcast signal, and the broadcast signal may be based on a specific wireless communication channel. The wireless communication channel includes but is not limited to a plurality of wireless communication channels mentioned in the foregoing paragraph, for example, a 4G V2X broadcast channel. The system includes a first initiator device, a first responder device, and a second responder device. The first initiator device, the first responder device, or the second responder device includes but is not limited to a vehicle, a component in a vehicle, a roadside unit device, or a component in a roadside unit device. In other words, the system may implement communication between OBUs, between an OBU and an RSU, or between RSUs based on broadcast communication. In the system, first unicast session interaction between the first initiator device and the first responder device may be established based on broadcast communication, or second unicast session interaction between the first initiator device and the second responder device may be established based on broadcast communication. The first unicast session interaction and the second unicast session interaction may be performed simultaneously by sharing a same broadcast message, or may be performed sequentially by using exclusive broadcast messages. The first unicast session interaction and the second unicast session interaction may be implemented in the following four method embodiments.

Optionally, the unicast session system may further include another initiator device (for example, a second initiator device) and another responder device. A unicast session between the another initiator device and the another responder device, or between the another initiator device or the another responder device and the first initiator device, the first responder device, or the second responder device may also be implemented with reference to the following four method embodiments. In FIG. 4 to FIG. 8, both solid line arrows and dashed line arrows are used to indicate receiving and sending directions of a broadcast signal, and the dashed line arrows indicate receiving and sending directions of the broadcast signal that are not closely related to descriptions of this solution but that are actually existed in a broadcast mechanism.

Figure 4:
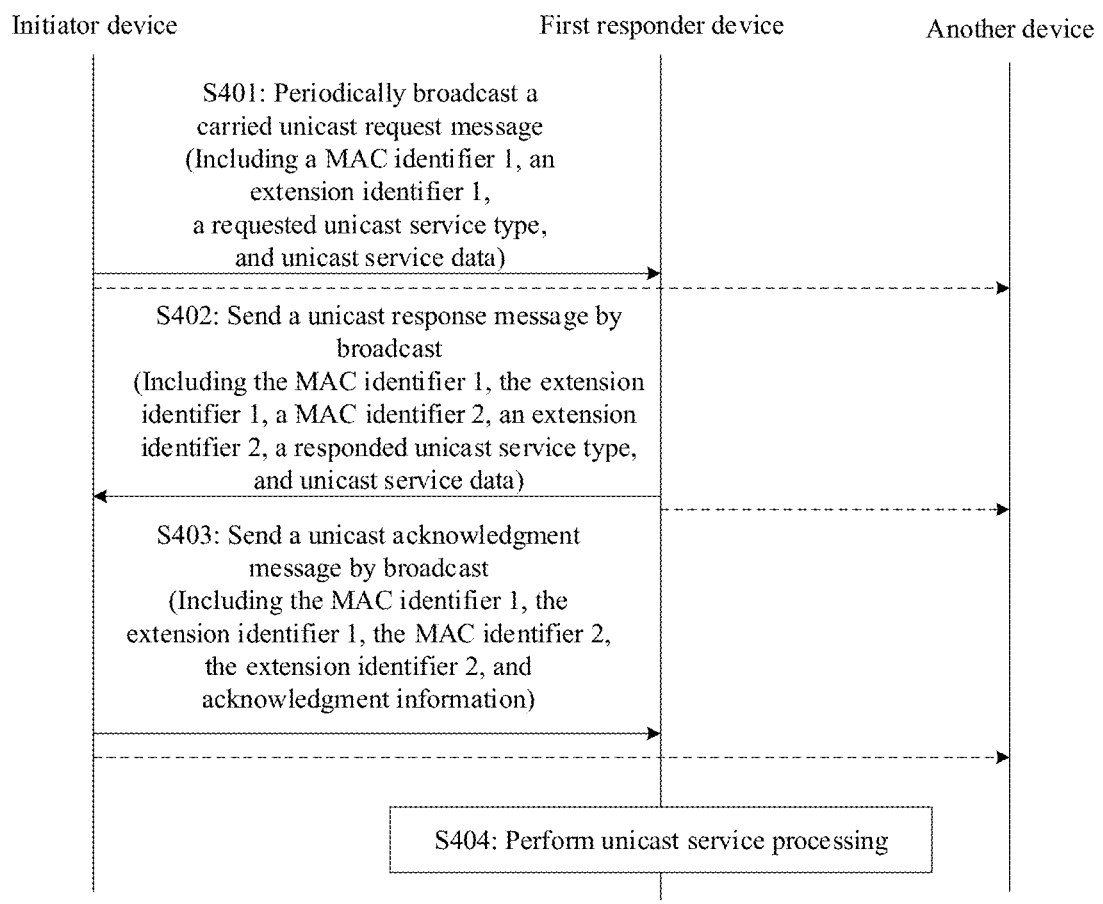
FIG. 4 is a flowchart of a broadcast-based unicast session method according to Embodiment 2 of the present application.

FIG. 4 is a flowchart of a broadcast-based unicast session method according to Embodiment 2 of the present application, including the following steps.

S401: An initiator device sends a unicast request message through periodic broadcast, where the unicast request message includes a charging-related unicast service type and charging-related unicast service data that are requested by the initiator device, and the unicast request message further includes a MAC identifier 1 generated by the initiator device and an extension identifier 1 of the initiator device.

The MAC identifier 1 is a random number generated by the initiator device.

The extension identifier 1 may include but is not limited to at least one of a device hardware identifier, a device network access identifier, an electronic identity, an IMEI (International Mobile Equipment Identity), or spatial location identifier information, or may be generated through mapping by using a function in which at least one of the foregoing identifiers is a parameter.

The extension identifier 1 may be generated as a random number, or may be generated through manual setting.

Figure 8:
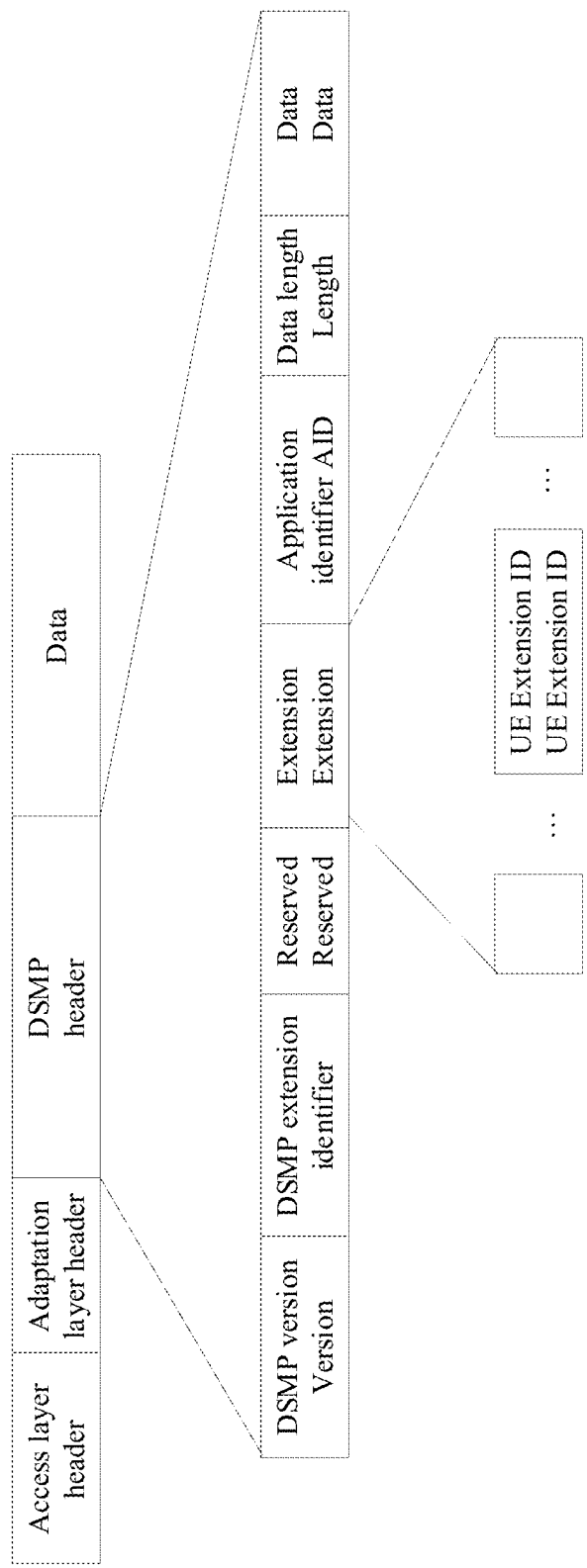
FIG. 8 is a schematic diagram of an example of adding an extension identifier to an interaction message according to an embodiment of the present application.

The extension identifier 1 may be filled in a DSMP protocol layer of a 4G V2X message. Refer to FIG. 8. As an example of filling an extension identifier of an initiator device in a 4G V2X message, the extension identifier 1 may be placed in a "UE Extension ID" field in an extension field of a DSMP packet header in FIG. 8.

In another example of filling an extension identifier of an initiator device in a 4G V2X message, the extension identifier 1 may alternatively be filled into a message body of a message layer. For example, a corresponding data element UE Extension ID is defined in the message body:

```
Unicast Message: = {
    ExtensionID UE Extension ID
    ExtensionID Target UE Extension ID
    ...
}
```

Optionally, the unicast request message further includes first sending indication information about how a responder returns a unicast response message, for example, may indicate at least one of a quantity of times of repeated sending or a repeated sending interval of the unicast response message. The first sending indication information may be determined based on a reliability and a delay requirement of a unicast service and a channel status, or may be obtained by the initiator device through analysis based on a data receiving status.

S402: After receiving the unicast request message, at least one responder device (including a first responder device in FIG. 4 and another possible device) within periodic broadcast coverage identifies the MAC identifier 1 and the extension identifier 1 of the initiator device in the unicast request message, to determine whether to make a response. After determining to establish a unicast session with the initiator device through broadcast, the first responder device sends a unicast response message through broadcast, where the unicast response message may be received by the initiator device, and may also be received by another device within the broadcast coverage. The unicast response message includes a unicast service type (for example, charging) and unicast service data (for example, an account or an amount) that are responded by the responder device, and the unicast response message further includes the MAC identifier 1 and the extension identifier 1 of the initiator device corresponding to the unicast response message, and a MAC identifier 2 and an extension identifier 2 of the first responder device.

The MAC identifier 2 is, for example, a random number generated by the responder device.

The extension identifier 2 may include by but is not limited to at least one of a hardware identifier, a network access identifier, an electronic identity, an IMEI (International Mobile Equipment Identity), a VIN (Vehicle Identification Number), or spatial location identifier information of the responder device or a device in the responder device, or may be generated through mapping by using a function in which at least one of the foregoing identifiers is a parameter.

The extension identifier 2 may be generated as a random number, or may be generated through manual setting.

A manner of filling the extension identifier 2 in the 4G V2X message is similar to the manner of filling the extension identifier 1 in the 4G V2X message. Details are not described herein again.

The quantity of times of repeatedly sending and the repeated sending interval of the unicast response message may be determined based on the first sending indication information, or may be determined based on a service load, a service priority, or the like.

Optionally, the unicast response message further includes second sending indication information about how the initiator returns a unicast acknowledgment message, for example, may indicate at least one of a quantity of times of repeated sending or a repeated sending interval of the unicast acknowledgment message. The second sending indication information may be determined based on a reliability and a delay requirement of a unicast service and a channel status, or may be obtained by the initiator device through analysis based on a data receiving status.

Figure 9:
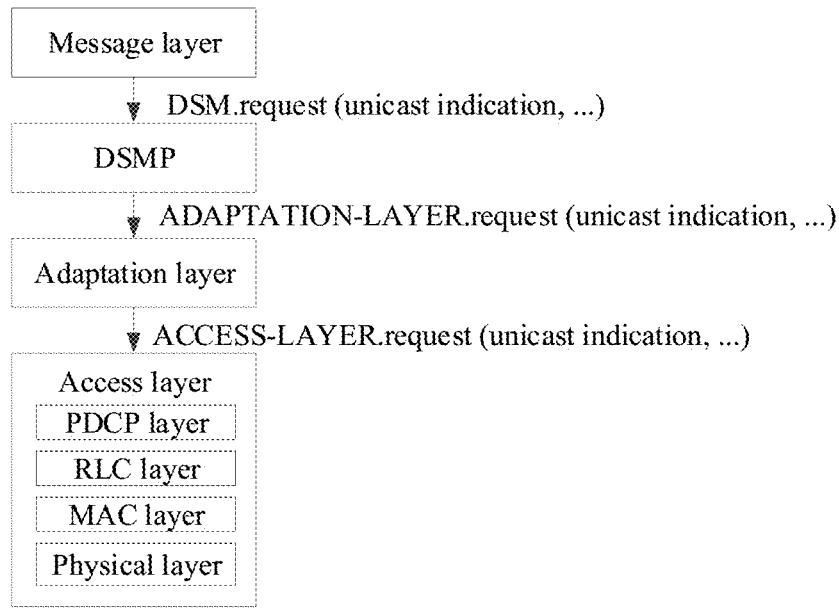
FIG. 9 is a schematic diagram of transferring a unicast service indication from a message layer to an access layer by using a service primitive according to an embodiment of the present application.

Optionally, to ensure that a unicast service data packet is not segmented or reassembled at an RLC (Radio Link Control) layer, and ensure that the data packet can still be correctly received and parsed when a MAC identifier conflict occurs, in a process of generating the unicast response message, the responder device indicates, by using a unicast service indication, the RLC layer not to perform a segmentation operation. In a specific operation manner, the unicast service indication may be transmitted from the message layer to an access layer by using a service primitive. Refer to FIG. 9. Here is an example:

DSM.request (unicast indication, . . . )
ADAPTATION-LAYER.request (unicast indication, . . . )
ACCESS-LAYER.request (unicast indication, . . . )

At the access layer, a dedicated unicast logical channel may be set, to indicate the RLC layer not to segment the data packet. The unicast service data is transmitted to the RLC layer through the unicast logical channel, and the RCL layer does not segment the data packet in the unicast logical channel. In addition, at the RLC layer, the unicast service indication may be carried in a Per-packet parameter to determine that a current data packet is a unicast service data packet, to determine not to perform the segmentation operation on the data packet.

S403: After receiving the unicast response message, the initiator device first verifies whether the MAC identifier and the extension identifier of the initiator carried in the unicast response message are respectively consistent with the MAC identifier and the extension identifier in the unicast request message sent by the initiator device before. If the MAC identifiers are inconsistent, the message is directly ignored. If the MAC identifiers are consistent but the extension identifiers are inconsistent, it indicates that a MAC identifier conflict exists, and the message is not sent to the initiator device, and is directly ignored. If the MAC identifiers are consistent and the extension identifiers are consistent, the MAC identifier 2 and the extension identifier 2 of the first responder device are recorded, and it may be determined that the unicast response message is in response to the unicast request message sent by the initiator device before. Then, the initiator device sends a unicast acknowledgment message through broadcast, where the unicast acknowledgment message includes acknowledgment information about the unicast service data in the unicast response message, the MAC identifier 1, the extension identifier 1, the MAC identifier 2, and the second extension identifier 2. Because the unicast acknowledgment message is sent based on broadcast, the message may be received by the first responder device and another device within coverage of the broadcast signal. Because the unicast acknowledgment message carries the MAC identifiers and the extension identifiers of the initiator device and the first responder device, only the first responder device identifies that the message is a message for the first responder device, and the another device ignores the unicast acknowledgment message.

The quantity of times of repeatedly sending and the repeated sending interval of the unicast acknowledgment message may be determined based on the second sending indication information, or may be determined based on a service load, a service priority, or the like.

Optionally, to ensure that the unicast service data packet is not segmented or reassembled at the RLC layer, and ensure that the data packet can still be correctly received and parsed when the MAC identifier conflict occurs, in a process of generating the unicast acknowledgment message, the initiator device indicates, by using a unicast service indication, the RLC layer not to perform the segmentation operation. In a specific operation manner, the unicast service indication may be transmitted from the message layer to the access layer by using a service primitive. Refer to FIG. 9. Here is an example:

DSM.request (unicast indication, . . . )
ADAPTATION-LAYER.request (unicast indication, . . . )
ACCESS-LAYER.request (unicast indication, . . . )

At the access layer, a dedicated unicast logical channel may be set, to indicate the RLC layer not to segment the data packet. The unicast service data is transmitted to the RLC layer through the unicast logical channel, and the RCL layer does not segment the data packet in the unicast logical channel. In addition, at the RLC layer, the unicast service indication may be carried in the Per-packet parameter to determine that the current data packet is a unicast service data packet, to determine not to perform the segmentation operation on the data packet.

After step S403, the first responder device performs step S404 of performing service processing related to the unicast session based on the first unicast acknowledgment message. The service processing related to the unicast session is service processing related to the unicast service type and the unicast service data that are in the first unicast response message. For example, in a vehicle near field payment scenario, the initiator device is a roadside toll collection device, and the responder device is a vehicle. After receiving a unicast acknowledgment message that is related to a payment service and that is from the roadside toll collection device, the vehicle performs service processing related to fee payment. For another example, in a vehicle platoon driving scenario, the initiator device is a first vehicle, and the responder device is a second vehicle. After receiving a unicast acknowledgment message that is from the first vehicle and that is related to platoon summoning, the second vehicle performs service processing of forming a vehicle platoon with the first vehicle.

In a unicast service connection, a plurality of responder devices may respond to the unicast service request initiated by the initiator device. The initiator device may distinguish identities based on MAC identifiers and extension identifiers of the responder devices in a plurality of unicast response messages, and select one of the responder devices to send the unicast acknowledgment message, or select a plurality of responder devices to separately send a unicast acknowledgment message to each of the plurality of responder devices. If the responder device receives the unicast acknowledgment message, the unicast service session is successfully completed. If the responder device does not receive the unicast acknowledgment message, it is possible that the initiator device does not respond to the responder terminal, or the responder does not receive the unicast acknowledgment message within waiting time.

For a possible MAC identifier conflict, in Embodiment 2, on one hand, an extension identifier is added to a session message between the initiator and the responder, to effectively distinguish different devices in the MAC identifier conflict; and on another hand, a unicast service is indicated to the RLC layer, so that the unicast service data packet is not segmented, thereby avoiding a message parsing failure caused by data reassembly at the RLC layer when the MAC identifier conflict occurs.

The following uses message exchange between a roadside toll collection device and a vehicle as an example to further describe other three broadcast-based unicast session methods provided in embodiments of the present application. The roadside toll collection device is used as an initiator device of a unicast session, and the vehicle is used as a responder device of the unicast session. In addition, the vehicle may alternatively be used as an initiator device of a unicast session, and the roadside toll collection device may be used as a responder device of the unicast session. This is not limited herein. It should be specially noted that, in the following several embodiments, technical content is not only applicable to message exchange between the roadside toll collection device and the vehicle, and related technical content in the following embodiments may be used for any other broadcast-based unicast message exchange between an initiator device and a responder device.

Figure 5:
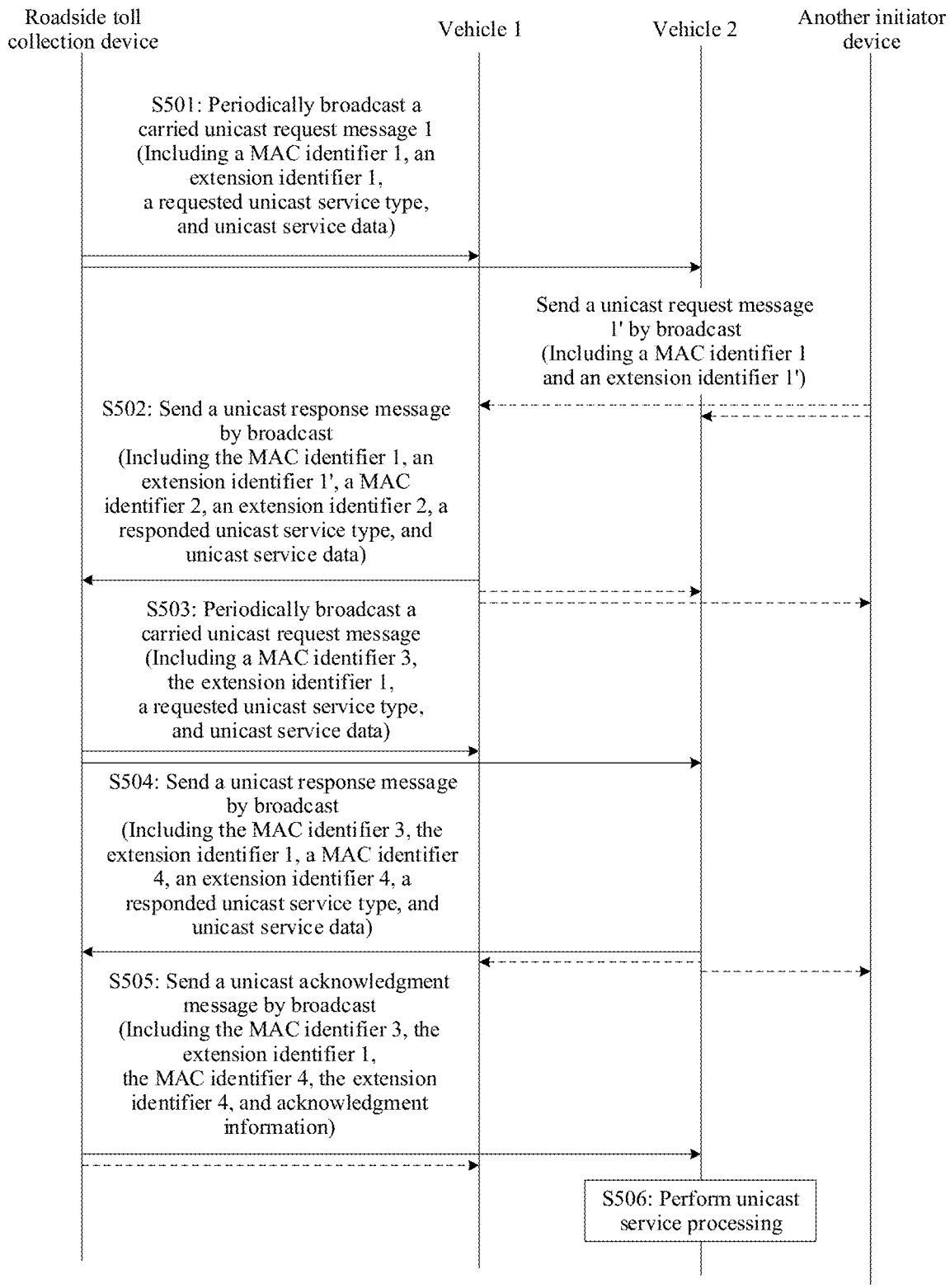
FIG. 5 is a flowchart of a broadcast-based unicast session method according to Embodiment 3 of the present application.

FIG. 5 is a flowchart of a broadcast-based unicast session method according to Embodiment 3 of the present application. A roadside toll collection device and another initiator device serve as initiators of a broadcast-based unicast session, and a vehicle 1 and a vehicle 2 serve as responders of the broadcast-based unicast session. Steps S501, S502, and S505 are respectively similar to steps S401, S402, and S403 in FIG. 4. Details are not described herein again, and only special parts are described.

In Embodiment 3 of the present application, after the roadside toll collection device serving as a unicast session requester receives a unicast response message responded by the vehicle 1 or the vehicle 2 serving as a unicast session responder, the roadside toll collection device compares an extension identifier of the responder device in the unicast response message with an extension identifier of the roadside toll collection device in the unicast request message sent by the roadside toll collection device, and performs different operations based on different comparison results. A MAC identifier 1 and a MAC identifier 3 are generated by the roadside toll collection device, a MAC identifier 2 is generated by the vehicle 1, and a MAC identifier 4 is generated by the vehicle 2. An extension identifier 1 is the extension identifier of the roadside toll collection device, an extension identifier 2 is the extension identifier of the vehicle 1, and an extension identifier 3 is the extension identifier of the vehicle 2.

In S501, a unicast request message 1 sent by the roadside toll collection device through broadcast can be received by the vehicle 1 and the vehicle 2 within broadcast coverage, and neither the vehicle 1 for the vehicle 2 responds to the unicast request message. At a near moment, the another initiator device sends a unicast request message 1' through broadcast. A MAC identifier of the initiator device in the unicast request message 1' is the same as the MAC identifier of the initiator device in the unicast request message 1' (both are the MAC identifier 1). The unicast request message 1' can also be received by the vehicle 1 and the vehicle 2, and the vehicle 1 responds to the unicast request message 1'. The vehicle 1 responds to the another initiator device with a unicast response message.

In S502, if the roadside toll collection device determines that the MAC identifier (the MAC identifier 1) of the initiator device in the unicast response message returned by the vehicle 1 is different from the MAC identifier (the MAC identifier 1) of the roadside toll collection device, but an extension identifier (an extension identifier 1') of the initiator device in the unicast response message returned by the vehicle 1 is different from the extension identifier (the extension identifier 1) of the roadside toll collection device, it indicates that the unicast response message received from the vehicle 1 is not a response to the roadside toll collection device, or the unicast request message previously sent by the roadside toll collection device is not successfully responded to, and a MAC identifier conflict occurs. In this case, the roadside toll collection device performs step S503 of sending a new unicast request message through periodic broadcast, where a MAC identifier in the new unicast request message is a MAC identifier 3 regenerated by the roadside toll collection device, and the MAC identifier 3 is different from the MAC identifier 1. Optionally, triggering of S503 may be further combined with a timing operation. For example, when S501 is performed, timing starts. If the corresponding unicast response message is not successfully received within a preset time threshold, S503 is performed to send a new unicast request message.

In S504, the re-sent unicast request message can be received by the vehicle 1 and the vehicle 2, and the vehicle 2 responds to the roadside toll collection device with a unicast response message through broadcast, where the unicast response message includes the MAC identifier 4 and the extension identifier 3 of the vehicle 2. This step is similar to S402 in FIG. 4. Details are not described herein again.

The roadside toll collection device determines, by identifying the MAC identifier 3 and the extension identifier 1 in the unicast response message in S504, that the unicast response message is a response made to the roadside toll collection device. In this case, the roadside toll collection device performs step S505 of sending a unicast acknowledgment message to the vehicle 2 through broadcast. Optionally, triggering of S505 may also be combined with a timing operation. For example, when S503 is performed, timing starts, and step S504 occurs within the preset time threshold, sending of the unicast acknowledgment message in S505 is performed.

After receiving the unicast acknowledgment message, the vehicle 2 performs step S506, that is, performs service processing related to fee payment based on the unicast acknowledgment message.

Figure 6:
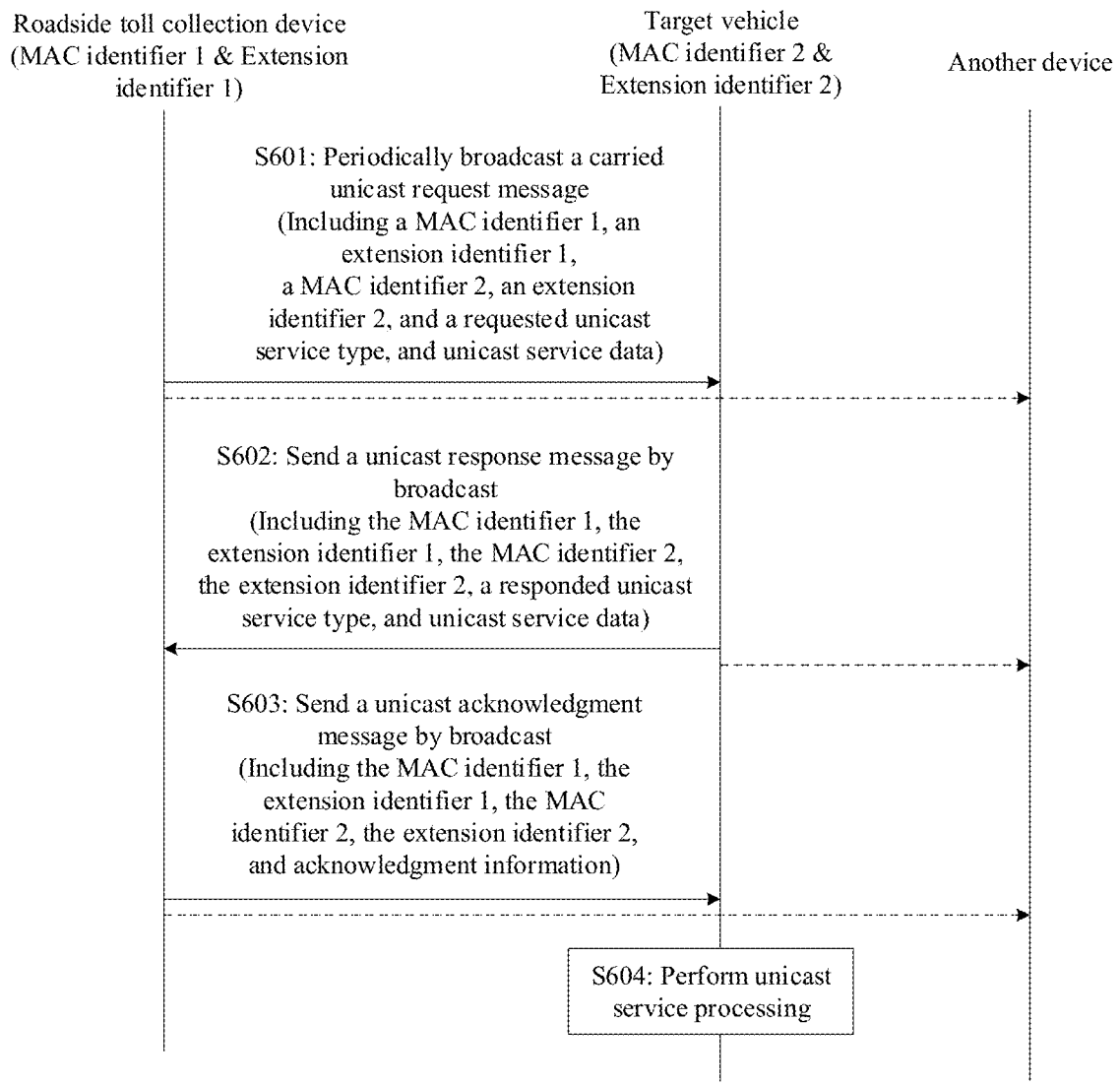
FIG. 6 is a flowchart of a broadcast-based unicast session method according to Embodiment 4 of the present application.

FIG. 6 is a flowchart of a broadcast-based unicast session method according to Embodiment 4 of the present application. Steps S602 and S603 are respectively similar to steps S402 and S403 in FIG. 4. Details are not described herein again, and only special parts are described.

In Embodiment 2 shown in FIG. 4, the initiator device does not limit the responder device of the unicast session, and all responder devices can respond to the initiator device provided that the responder devices are within the communication range of the initiator device.

In Embodiment 3 shown in FIG. 6, a roadside toll collection device used as an initiator device (where a current MAC identifier and extension identifier of the roadside toll collection device are a MAC identifier 1 and an extension identifier 1 respectively) learns, by using a broadcast message or preset information, MAC identifiers generated by surrounding responder devices and extension identifiers of the surrounding responder devices. Therefore, a unicast request message in S601 not only carries the MAC identifier generated by the roadside toll collection device and the extension identifier of the roadside toll collection device, but also carries a MAC identifier and an extension identifier of a responder device that the initiator device expects to establish a unicast session with, to establish the unicast session with the designated responder device. The unicast request message in S601 may be received by a target vehicle and another device within broadcast coverage.

In S602, after receiving the unicast request message in S601, the target vehicle serving as the responder device (where a current MAC identifier and extension identifier of the target vehicle are a MAC identifier 2 and an extension identifier 2) first determines whether the MAC identifier and the extension identifier of the responder in the message are consistent with those of the target vehicle (that is, whether the MAC identifier and the extension identifier are the MAC identifier and the extension identifier in the unicast request message in S601). If the identifiers are inconsistent, the message is ignored, and a unicast session with the initiator is not established; or if the identifiers are consistent, a unicast response message is sent to the roadside toll collection device. In this embodiment, a determining result is that the identifiers are consistent. To be specific, the target vehicle determines that the unicast request message is a unicast session invitation sent to the target vehicle. Therefore, the target vehicle sends the unicast response message to the roadside toll collection device through broadcast.

In step S603, the roadside toll collection device determines, by identifying that an MAC identifier of the initiator device in the unicast response message is the MAC identifier (the MAC identifier 1) of the roadside toll collection device, an extension identifier of the initiator device is the extension identifier (the extension identifier 1) of the roadside toll collection device, a MAC identifier of the responder device is the MAC identifier (the MAC identifier 2) of the device to be invited, and an extension identifier of the responder device is the extension identifier (the extension identifier 2) of the device to be invited, that the unicast response message in S602 is a response made to the unicast request message in S601. Then a unicast acknowledgment message is sent to the target vehicle through broadcast.

After receiving the unicast acknowledgment message, the target vehicle performs step S604, that is, performs service processing related to fee payment based on the unicast acknowledgment message.

Figure 7:
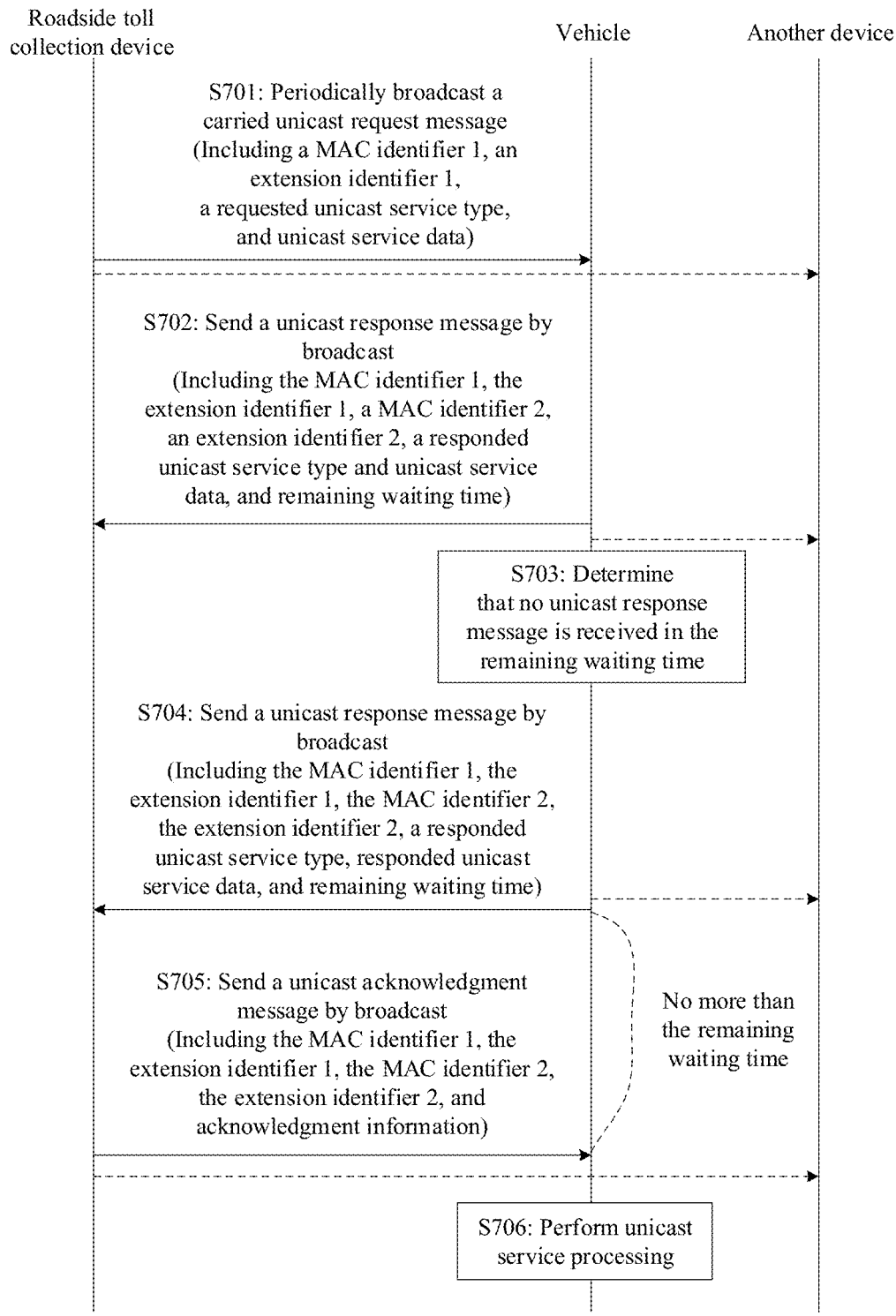
FIG. 7 is a flowchart of a broadcast-based unicast session method according to Embodiment 5 of the present application.

FIG. 7 is a flowchart of a broadcast-based unicast session method according to Embodiment 5 of the present application. A roadside toll collection device serves as an initiator device of a unicast session, and a vehicle and another device serve as responder devices of the unicast session within broadcast coverage. Step S701 is similar to step S401 in FIG. 4. Details are not described herein again, and only special parts are described.

In S702, in addition to the content similar to that in the unicast response message in step S402 in FIG. 4, a unicast response message sent by the vehicle to the roadside toll collection device through broadcast further includes a remaining indication time, where the remaining indication time has different values in a plurality of repeatedly sent unicast response messages based on a real-time countdown status. A determining step is performed in step 703. Starting from sending the last unicast response message in the plurality of unicast response messages, if the vehicle does not successfully receive a corresponding unicast acknowledgment message within a remaining waiting time of the last unicast response message, step S704 of re-sending the plurality of repeated unicast response messages that are sent through broadcast in step S702 is performed.

Optionally, in the plurality of re-sent repeated unicast response messages, a MAC identifier 2 may be replaced with a MAC identifier 4 newly generated by the vehicle, to increase a probability of successful acknowledgment.

Step S705 and step S706 are similar to step S604 and step S605. Details are not described herein again. It should be noted that, in step S706, the vehicle successfully receives a corresponding unicast acknowledgment message within a preset time threshold starting from sending the unicast response message in S704.

After receiving the unicast acknowledgment message, the vehicle performs step S706, that is, performs service processing related to fee payment based on the unicast acknowledgment message.

Figure 10:
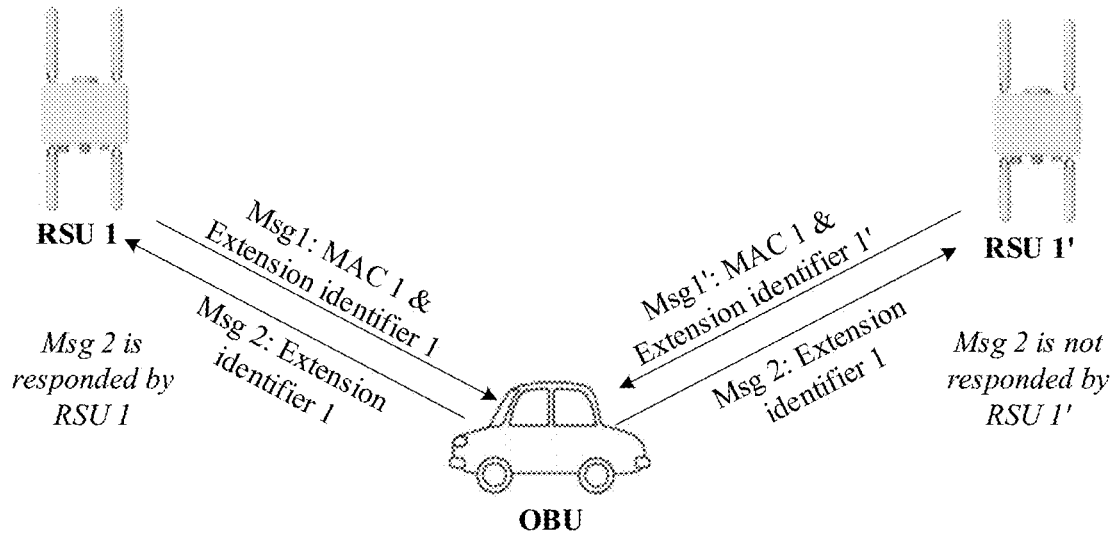
FIG. 10 is a schematic diagram of a technical effect that can be achieved according to an embodiment of the present application.

Through the foregoing several embodiments, the present application can achieve a technical effect of implementing a reliable unicast session by using a broadcast communication mechanism. As shown in FIG. 10, if both an RSU 1 and an RSU 1' want to establish a unicast session with an OBU at a same moment, the RSU 1 sends a unicast request message Msg 1 to the OBU, where the unicast request message Msg 1 carries a MAC 1 and an extension identifier 1, and the RSU 1' sends a unicast request message Msg 1' to the OBU, where the unicast request message Msg 1' carries a MAC 1 and an extension identifier 1'. After the OBU receives the Msg 1 and the Msg 1', although the MAC identifier generated by the RSU 1 conflicts with the MAC identifier generated by the RSU 1', the OBU may distinguish, by identifying the extension identifier in the message, that the Msg 1 and the Msg 1' are from different devices. The OBU selects a device corresponding to the extension identifier 1 for replying, that is, sends a message Msg 2 to respond to the Msg 1 from the RSU 1, and both the RSU 1 and the RSU 1' may receive the Msg 2. The RSU 1 determines, by identifying the extension identifier 1 in the Msg 2, that the Msg 2 is a response made to the RSU 1. The RSU 1 determines, by identifying the extension identifier 1 in the Msg 2, that the Msg 2 is not a response made to the RSU 1', and subsequently may regenerate a MAC identifier different from the MAC 1, and replace the MAC 1 with the regenerated MAC identifier to resend the Msg 1' until a response message from the OBU is correctly received.

Figure 11:
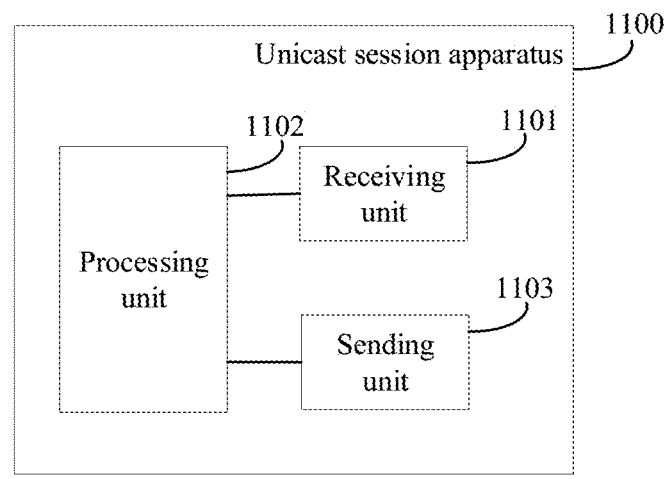
FIG. 11 is a structural block diagram of a broadcast-based unicast session apparatus according to Embodiment 6 and Embodiment 7 of the present application.

Embodiment 6 and Embodiment 7 of the present application each provides a broadcast-based unicast session apparatus on an initiator side and a responder side, as shown in FIG. 11.

The broadcast-based unicast session apparatus 1100 provided in Embodiment 6 of the present application includes:

a receiving unit 1101, configured to: receive a first unicast response message from a responder device, where the first unicast response message includes a unicast service type responded by the responder device, unicast service data responded by the responder device, a first MAC identifier, a first extension identifier, a second MAC identifier generated by the responder device, and a second extension identifier of the responder device; and receive a second unicast response message from the responder device, where the second unicast response message includes the unicast service type responded by the responder device, the unicast service data responded by the responder device, the first MAC identifier, a fifth extension identifier different from the first extension identifier, the second MAC identifier, and the second extension identifier;

a processing unit 1102, configured to determine, based on unicast indication information in a message layer of the unicast acknowledgment message, not to segment a data packet at an RLC layer of the unicast acknowledgment message; and a sending unit 1103, configured to: send a first unicast request message through periodic broadcast, where the first unicast request message includes a unicast service type requested by an initiator device of the unicast session, unicast service data requested by the initiator device, a first MAC identifier generated by the initiator device, and a first extension identifier of the initiator device; repeatedly send a plurality of unicast acknowledgment messages, where the unicast acknowledgment message includes acknowledgment information of the unicast service data responded by the responder device, the first MAC identifier, the first extension identifier, the second MAC identifier, and the second extension identifier; and send a second unicast request message through periodic broadcast, where the second unicast request message includes the unicast service type requested by the initiator device of the unicast session, the unicast service data requested by the initiator device, a third media access control MAC identifier that is regenerated by the initiator device and that is different from the first MAC identifier, and the first extension identifier of the initiator device.

The broadcast-based unicast session apparatus 1100 on the initiator side provided in Embodiment 6 of the present application includes but is not limited to an RSU or an OBU (including a vehicle or a component in a vehicle), and may be used in a scenario such as vehicle near field payment, vehicle-assisted decision-making, or vehicle platoon driving.

The broadcast-based unicast session apparatus 1100 provided in Embodiment 7 of the present application includes:

a receiving unit 1101, configured to: receive a unicast request message from an initiator device of the unicast session, where the unicast request message includes a unicast service type requested by the initiator device, unicast service data requested by the initiator device, a first MAC identifier generated by the initiator device, and a first extension identifier of the initiator device; and receive a unicast acknowledgment message from the initiator device, where the unicast acknowledgment message includes acknowledgment information of the unicast service data responded by the responder device, the first MAC identifier, the first extension identifier, the second MAC identifier, and the second extension identifier;

a processing unit 1102, configured to determine, based on unicast indication information in a message layer of the unicast response message, not to segment a data packet at an RLC layer of the unicast response message; and a sending unit 1103, configured to repeatedly send a plurality of unicast response messages, where the unicast response message includes a unicast service type responded by the responder device of the unicast session, unicast service data responded by the responder device, the first MAC identifier, the first extension identifier, the second MAC identifier generated by the responder device, and the second extension identifier of the responder device; and further configured to: starting from sending the last unicast response message of the plurality of unicast response messages, if the unicast acknowledgment message is not received within the remaining waiting time of the last unicast response message, resend the plurality of repeated unicast response messages.

The broadcast-based unicast session apparatus 1100 on the responder side provided in Embodiment 7 of the present application includes but is not limited to an RSU or an OBU (including a vehicle or a component in a vehicle), and may be used in a scenario such as vehicle near field payment, vehicle-assisted decision-making, or vehicle platoon driving.

Only one or more of the units in Embodiment 6 and Embodiment 7 may be implemented by software, hardware, firmware, or a combination thereof. The software or firmware includes but is not limited to computer program instructions or code, and may be executed by a hardware processor. The hardware includes but is not limited to various integrated circuits, for example, a central processing unit (CPU), a digital signal processor (DSP), a field-programmable gate array (FPGA), or an application-specific integrated circuit (ASIC).

Figure 12:
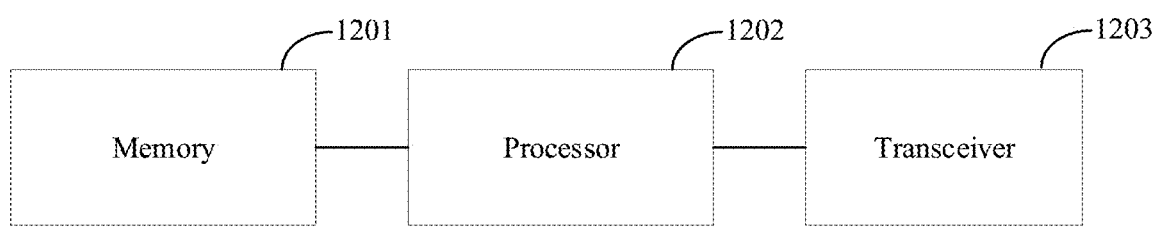
FIG. 12 is a structural block diagram of a broadcast-based unicast session apparatus according to Embodiment 8 and Embodiment 9 of the present application.

Embodiment 8 and Embodiment 9 of the present application each provides a broadcast-based unicast session apparatus on an initiator side and a responder side, as shown in FIG. 12.

The broadcast-based unicast session apparatus on the initiator side provided in Embodiment 8 of the present application includes a memory 1201, a processor 1202, and a transceiver 1203. The memory 1201 stores a computer program instruction. The processor 1202 runs the computer program instruction to perform the broadcast-based unicast session method on the initiator side described in Embodiments 2 to 4. The transceiver 2203 is configured to send a unicast request message and a unicast acknowledgment message, and is further configured to receive a unicast response message. The broadcast-based unicast session apparatus on the initiator side provided in Embodiment 8 of the present application includes but is not limited to an RSU or an OBU (including a vehicle or a component in a vehicle), and may be used in a scenario such as vehicle near field payment, vehicle-assisted decision-making, or vehicle platoon driving.

The broadcast-based unicast session apparatus on the responder side provided in Embodiment 9 of the present application includes a memory 1201, a processor 1202, and a transceiver 1203. The memory 1201 stores a computer program instruction. The processor 1202 runs the computer program instruction to perform the broadcast-based unicast session method on the responder side described in Embodiments 2 to 4. The transceiver 2203 is configured to receive a unicast request message and a unicast acknowledgment message, and is further configured to send a unicast response message. The broadcast-based unicast session apparatus on the responder side provided in Embodiment 9 of the present application includes but is not limited to an RSU or an OBU (including a vehicle or a component in a vehicle), and may be used in a scenario such as vehicle near field payment, vehicle-assisted decision-making, or vehicle platoon driving.

The processors in Embodiment 8 and Embodiment 9 of the present application include but are not limited to various CPUs, DSPs, micro-controllers, microprocessors, or artificial intelligence processors.

The transceivers in Embodiment 8 and Embodiment 9 of the present application include but are not limited to a communications interface, a communications module, or a communications connector. A communication form of the transceiver includes but is not limited to 2G (second generation mobile communication technology), 3G (third generation mobile communication technology), 4G (fourth generation mobile communication technology), 5G (fifth generation mobile communication technology), Wi-Fi (Wireless Fidelity), WiMAX (Worldwide Interoperability for Microwave Access), Bluetooth (Bluetooth communication technology), ZigBee (ZigBee communication technology), optical communication, satellite communications, infrared communications, or the like.

Figure 13:
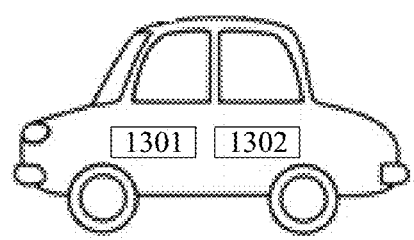
FIG. 13 is a structural block diagram of a vehicle according to Embodiment 10 of the present application.

Embodiment 10 of the present application provides a vehicle. As shown in FIG. 13, the vehicle includes a unicast session apparatus 1301 that can be used as an initiator device and a unicast session apparatus 1302 that can be used as a responder device. The unicast session apparatus 1301 may be the unicast session apparatus described in Embodiment 6 or Embodiment 8, and the unicast session apparatus 1302 may be the unicast session apparatus described in Embodiment 7 or Embodiment 9. It should be noted that, the unicast session apparatus 1301 and the unicast session apparatus 1302 may be two apparatuses independent of each other on hardware in a vehicle, or may be implemented by an apparatus having a signal receiving, sending, and processing function, which is not limited herein.

A person skilled in the art may clearly understand that, descriptions of embodiments provided in this application may be mutually referenced. For ease and brevity of description, for example, for functions of the apparatuses and devices and performed steps that are provided in embodiments of this application, refer to related descriptions in method embodiments of this application. Reference can also be made between various method embodiments and between various apparatus embodiments.

A person skilled in the art may understand that all or some of the steps of the method embodiments may be implemented by a program instructing related hardware. The program may be stored in a computer-readable storage medium. When the program is executed, all or some of the steps of the method embodiments are performed. The foregoing storage medium includes various media that can store program code, such as a ROM, a RAM, a magnetic disk, or an optical disc.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to embodiments of the present application are all or partially generated. The computer may be a general-purpose computer, a special-purpose computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

In the several embodiments provided in this application, it should be understood that the disclosed system, apparatus, and method may be implemented in other manners without departing from the scope of this application. For example, the described embodiments are merely examples. For example, division into the modules or units is merely logical function division and may be other division in actual implementation. For example, a plurality of units or components may be combined or integrated into another system, or some features may be ignored or not performed. The units described as separate parts may or may not be physically separate, and parts displayed as units may or may not be physical units, may be located in one position, or may be distributed on a plurality of network units. Some or all the modules may be selected according to actual needs to achieve the objectives of the solutions of embodiments. A person of ordinary skill in the art may understand and implement embodiments of the present application without creative efforts.

In addition, the schematic diagrams illustrating the system, apparatus, method, and different embodiments may be combined or integrated with other systems, modules, technologies or methods without departing from the scope of this application. In addition, the displayed or discussed mutual couplings or direct couplings or communication connections may be implemented by using some interfaces. The indirect couplings or communication connections between the apparatuses or units may be implemented in electronic, mechanical, or other forms.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A broadcast-based unicast session system, comprising an initiator device and at least one responder device, wherein the at least one responder device comprises a first responder device, wherein the initiator device is configured to send a first unicast request message through periodic broadcast, wherein the first unicast request message comprises a unicast service type requested by the initiator device of a unicast session, unicast service data requested by the initiator device, and a first media access control (MAC) identifier and a first extension identifier of the initiator device, and the first extension identifier is different from the first MAC identifier;

the first responder device is configured to: receive the first unicast request message, and send, based on the received first unicast request message, a first unicast response message through broadcast, wherein the first unicast response message comprises a unicast service type responded by the first responder device of the unicast session, unicast service data responded by the first responder device, the first MAC identifier, the first extension identifier, and a second MAC identifier and a second extension identifier of the first responder device, and the second extension identifier is different from the second MAC identifier;

the initiator device is further configured to: receive the first unicast response message, and send, based on the received first unicast response message, a first unicast acknowledgment message through broadcast, wherein the first unicast acknowledgment message comprises acknowledgment information of the unicast service data responded by the first responder device, the first MAC identifier, the first extension identifier, the second MAC identifier, and the second extension identifier, wherein the first unicast acknowledgment message comprises a message layer and a radio link control layer, wherein content information of the first unicast acknowledgment message at the radio link control layer is carried by a data packet, and the message layer of the first unicast acknowledgment message comprises information used to indicate an attribute of a unicast message; and the first responder device is further configured to: receive the first unicast acknowledgment message, and perform service processing related to the unicast session based on the first unicast acknowledgment message.

2. A broadcast-based unicast session apparatus, comprising at least one processor and at least one memory coupled to the at least one processor, wherein the at least one memory stores program instructions, which when executed by the at least one processor cause the apparatus to:

send a first unicast request message through periodic broadcast, wherein the first unicast request message comprises a unicast service type requested by an initiator device of a unicast session, unicast service data requested by the initiator device, and a first media access control (MAC) identifier and a first extension identifier of the initiator device, and the first extension identifier is different from the first MAC identifier;

receive a first unicast response message sent by a first responder device through broadcast, wherein the first unicast response message comprises a unicast service type responded by the first responder device, unicast service data responded by the first responder device, the first MAC identifier, the first extension identifier, and a second MAC identifier and a second extension identifier of the first responder device, and the second extension identifier is different from the second MAC identifier; and send, based on the received first unicast response message, a first unicast acknowledgment message through broadcast, wherein the first unicast acknowledgment message comprises acknowledgment information of the unicast service data responded by the first responder device, the first MAC identifier, the first extension identifier, the second MAC identifier, and the second extension identifier, wherein the first unicast acknowledgment message comprises a message layer and a radio link control layer, wherein content information of the first unicast acknowledgment message at the radio link control layer is carried by a data packet, and the message layer of the first unicast acknowledgment message comprises information used to indicate an attribute of a unicast message.

3. The apparatus according to claim 2, wherein when executed by the at least one processor the program instructions further cause the apparatus to:

receive a second unicast response message sent by a second responder device through broadcast, wherein the second unicast response message comprises a unicast service type responded by the second responder device, unicast service data responded by the second responder device, the first MAC identifier, the first extension identifier, and a third MAC identifier and a third extension identifier of the second responder device; and select, from a plurality of unicast response messages comprising the first unicast response message and the second unicast response message, at least one unicast response message comprising the first unicast response message as a responded unicast response message, wherein a MAC identifier of the initiator device comprised in each of the at least one unicast response message is the first MAC identifier, and an extension identifier of the initiator device comprised in each unicast response message is the first extension identifier.

4. The apparatus according to claim 3, wherein the at least one unicast response message used as the responded unicast response message further comprises a third unicast response message sent by a third responder device through broadcast;

the third unicast response message comprises a unicast service type responded by the third responder device, unicast service data responded by the third responder device, the first MAC identifier, the first extension identifier, and a fourth MAC identifier and a fourth extension identifier of the third responder device; and wherein when executed by the at least one processor the program instructions further cause the apparatus to:

receive, the third unicast response message sent by the third responder device through broadcast; and send, based on the third unicast response message, a second unicast acknowledgment message through broadcast, wherein the second unicast acknowledgment message comprises acknowledgment information of the unicast service data responded by the third responder device, the first MAC identifier, the first extension identifier, the fourth MAC identifier, and the fourth extension identifier.

5. The apparatus according to claim 2, wherein the first unicast request message further comprises first sending indication information, used to indicate at least one of a quantity of times of repeated sending or a repeated sending interval of the first unicast response message.

6. The apparatus according to claim 2, wherein the sending a first unicast acknowledgment message through broadcast includes repeatedly sending the first unicast acknowledgment message through broadcast, and the first unicast response message further comprises second sending indication information, used to indicate at least one of a quantity of times of repeated sending, a repeated sending interval, or remaining waiting time of the first unicast acknowledgment message.

7. The apparatus according to claim 6, wherein at least one of an actual quantity of times of repeated sending or an actual repeated sending interval of the first unicast acknowledgment message is determined based on the second sending indication information.

8. The apparatus according to claim 2, wherein the first unicast request message further comprises the second MAC identifier and the second extension identifier, and the second extension identifier is different from the second MAC identifier.

9. The apparatus according to claim 2, wherein when executed by the at least one processor the program instructions further cause the apparatus to:

receive a fourth unicast response message from the second responder device, wherein the fourth unicast response message comprises the unicast service type responded by the second responder device, the unicast service data responded by the second responder device, the first MAC identifier, a fifth extension identifier different from the first extension identifier, and the MAC identifier and the extension identifier of the second responder device; and send a second unicast request message through periodic broadcast, wherein the second unicast request message comprises the unicast service type requested by the initiator device of the unicast session, the unicast service data requested by the initiator device, and an updated MAC identifier and the first extension identifier of the initiator device, and the updated MAC identifier of the initiator device is different from the first MAC identifier.

10. A broadcast-based unicast session apparatus, comprising at least one processor and at least one memory coupled to the at least one processor, wherein the at least one memory stores program instructions, which when executed by the at least one processor cause the apparatus to:
receive a first unicast request message sent by an initiator device of a unicast session through periodic broadcast, wherein the first unicast request message comprises a unicast service type requested by the initiator device, unicast service data requested by the initiator device, and a first media access control (MAC) identifier and a first extension identifier of the initiator device, and the first extension identifier is different from the first MAC identifier;
send, based on the received first unicast request message, a first unicast response message through broadcast, wherein the first unicast response message comprises a unicast service type responded by a first responder device of the unicast session, unicast service data responded by the first responder device, the first MAC identifier, the first extension identifier, and a second MAC identifier and a second extension identifier of the first responder device, and the second extension identifier is different from the second MAC identifier, wherein the first unicast response message comprises a message layer and a radio link control layer, wherein content information of the first unicast response message at the radio link control layer is carried by a data packet, and the message layer of the first unicast response message comprises information used to indicate an attribute of a unicast message;
receive a first unicast acknowledgment message from the initiator device, wherein the first unicast acknowledgment message comprises acknowledgment information of the unicast service data responded by the first responder device, the first MAC identifier, the first extension identifier, the second MAC identifier, and the second extension identifier; and
perform service processing related to the unicast session based on the first unicast acknowledgment message.

11. The apparatus according to claim 10, wherein the sending a first unicast response message through broadcast includes repeatedly sending the first unicast response message through broadcast, and the first unicast request message further comprises first sending indication information, used to indicate at least one of a quantity of times of repeated sending or a repeated sending interval of the first unicast response message.

12. The apparatus according to claim 11, wherein at least one of an actual quantity of times of repeated sending or an actual repeated sending interval of the first unicast response message is determined based on the first sending indication information.

13. The apparatus according to claim 10, wherein the first unicast response message further comprises second sending indication information, used to indicate at least one of a quantity of times of repeated sending, a repeated sending interval, or remaining waiting time of the first unicast acknowledgment message.

14. The apparatus according to claim 13, wherein when executed by the at least one processor the program instructions further cause the apparatus to:
re-send the first unicast response message through broadcast, based on the first unicast acknowledgment message being not received within the remaining waiting time start from sending the first unicast response message.

15. The apparatus according to claim 10, wherein the first unicast request message further comprises the second MAC identifier and the second extension identifier; and
when executed by the at least one processor the program instructions further cause the apparatus to: send the first unicast response message through broadcast, when the second MAC identifier in the first unicast request message is the same as a current MAC identifier of the first responder device, and the second extension identifier in the first unicast request message is the same as an extension identifier of the first responder device.

* * * * *